(12) United States Patent
VanTassell et al.

(10) Patent No.: US 11,054,719 B2
(45) Date of Patent: Jul. 6, 2021

(54) PRIVACY SHUTTER FOR COMPUTER CAMERA WITH FINGER GRIP

(71) Applicant: Handstands Promo, LLC, Salt Lake City, UT (US)

(72) Inventors: Brandon VanTassell, Salt Lake City, UT (US); Stefan Leimer, Salt Lake City, UT (US); Jason Fogg, Salt Lake City, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 247 days.

(21) Appl. No.: 16/399,306

(22) Filed: Apr. 30, 2019

(65) Prior Publication Data

US 2019/0258137 A1 Aug. 22, 2019

Related U.S. Application Data

(63) Continuation-in-part of application No. 15/837,778, filed on Dec. 11, 2017, now Pat. No. 10,761,404.

(60) Provisional application No. 62/665,025, filed on May 1, 2018.

(51) Int. Cl.
| | | |
|---|---|---|
| *G02B 26/02* | (2006.01) | |
| *G03B 9/38* | (2021.01) | |
| *H04N 5/225* | (2006.01) | |
| *G03B 17/56* | (2021.01) | |
| *G03B 9/46* | (2021.01) | |

(52) U.S. Cl.
CPC .............. *G03B 9/38* (2013.01); *G03B 9/46* (2013.01); *G03B 17/565* (2013.01); *H04N 5/2254* (2013.01)

(58) Field of Classification Search
CPC .......... G03B 9/38; G03B 17/565; G03B 9/46; H04N 5/2254
USPC ......................................................... 359/227
See application file for complete search history.

(56) References Cited

U.S. PATENT DOCUMENTS

| | | |
|---|---|---|
| D669,112 S | 10/2012 | Gustaveson, II |
| D708,657 S | 7/2014 | Gustaveson |
| D721,396 S | 1/2015 | Gustaveson, II |
| D763,843 S | 8/2016 | Gustaveson, II |
| D782,562 S | 3/2017 | Gustaveson, II |
| 9,829,770 B1 | 11/2017 | Gustaveson, II |
| D807,947 S | 1/2018 | Gustaveson, II |
| D808,457 S | 1/2018 | Gustaveson, II |

(Continued)

FOREIGN PATENT DOCUMENTS

| | | |
|---|---|---|
| WO | WO DM/095 351 | 9/2016 |
| WO | WO DM/095 613 | 9/2016 |

OTHER PUBLICATIONS

Targus, "Spy Guard Webcam Cover", http://www.tagus.com/us/spy-guard-webcam-cover-3-pack-awh012us As accessed on this date: Dec. 14, 2017.

(Continued)

*Primary Examiner* — Euncha P Cherry
(74) *Attorney, Agent, or Firm* — Thorpe, North & Western, LLP

(57) ABSTRACT

A privacy shutter selectively covers and exposes a camera lens on a computer device. The privacy shutter has a frame with an aperture and a screen carried by the frame and slidable in the aperture. The screen moves between open and closed positions. A fingertip grip has a low-profile dome coupled to the screen.

20 Claims, 12 Drawing Sheets

(56) References Cited

U.S. PATENT DOCUMENTS

| | | | |
|---|---|---|---|
| D810,180 S | 2/2018 | Gustaveson, II | |
| 10,015,296 B1 | 7/2018 | Haymond | |
| D836,154 S | 12/2018 | Gustaveson, II | |
| D849,123 S | 5/2019 | Gustaveson, II | |
| 10,317,776 B2 | 6/2019 | Gustaveson, II | |
| 2007/0058045 A1* | 3/2007 | Misawa | H04N 5/2254 348/207.99 |
| 2015/0015777 A1 | 1/2015 | Osborne | |
| 2015/0070575 A1 | 3/2015 | Lee et al. | |
| 2018/0059510 A1* | 3/2018 | Gustaveson, II | H04N 5/2257 |
| 2019/0179212 A1 | 6/2019 | Leimer | |

OTHER PUBLICATIONS

Hit Promotional Products, "#265 Security Webcam Cover", https://www.hitpromo.net/product/show/265/security-webcam-cover As accessed on this date: Dec. 14, 2017.

* cited by examiner

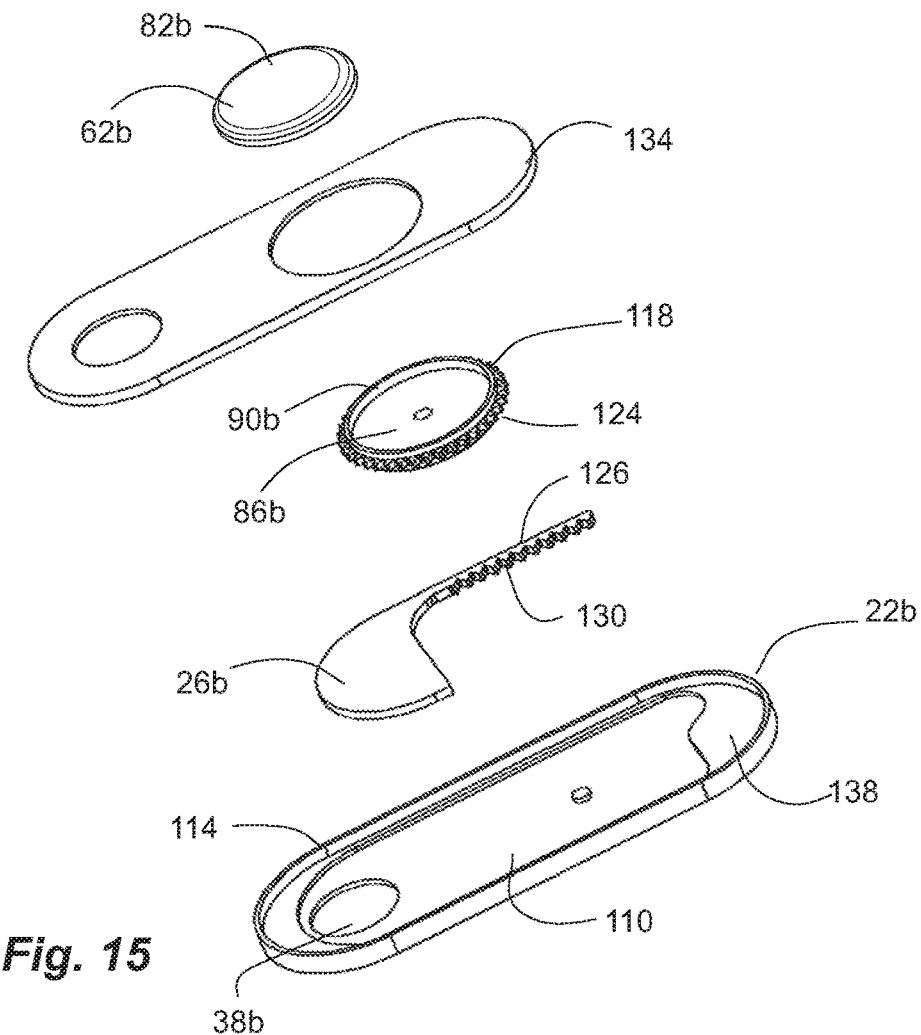
Fig. 15
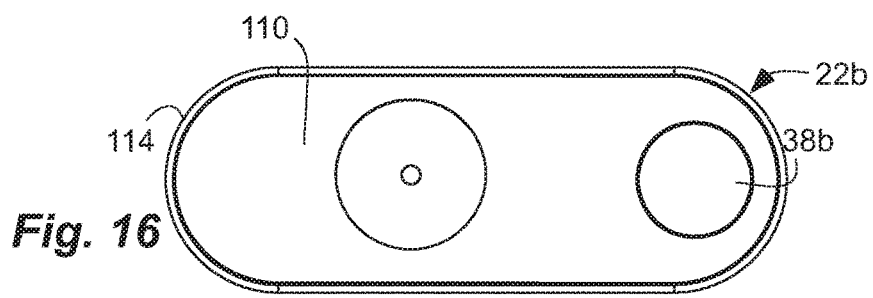
Fig. 16
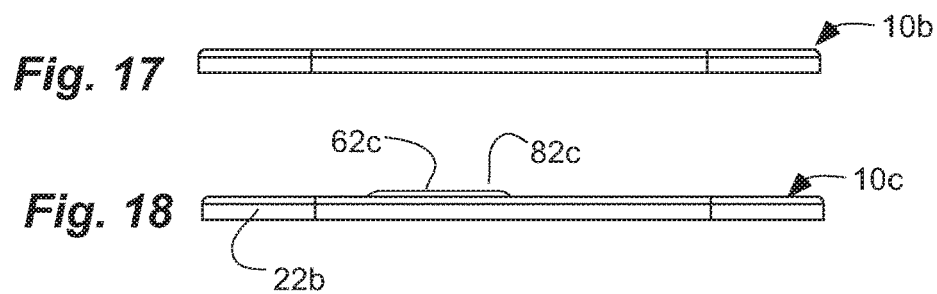
Fig. 17
Fig. 18

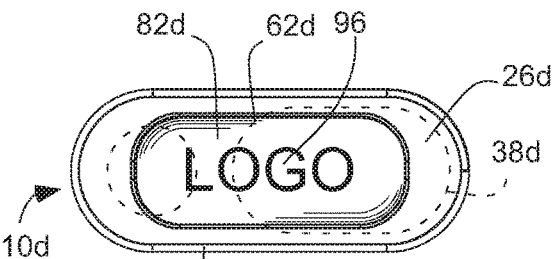
Fig. 19
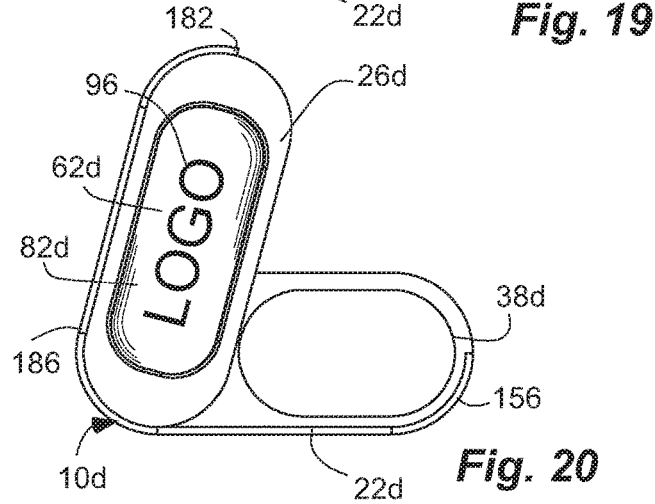
Fig. 20
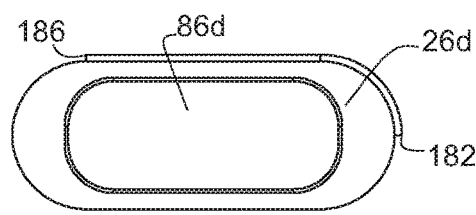
Fig. 22
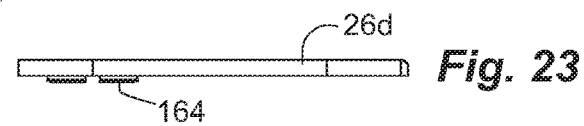
Fig. 23
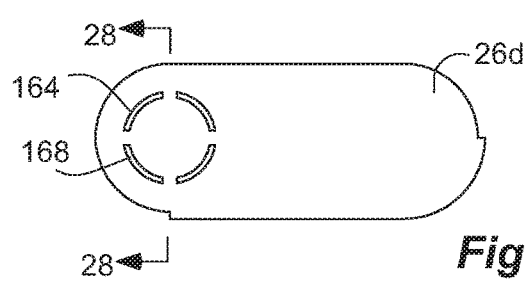
Fig. 24
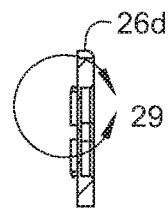
Fig. 28
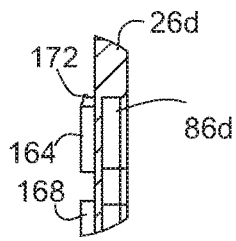
Fig. 29
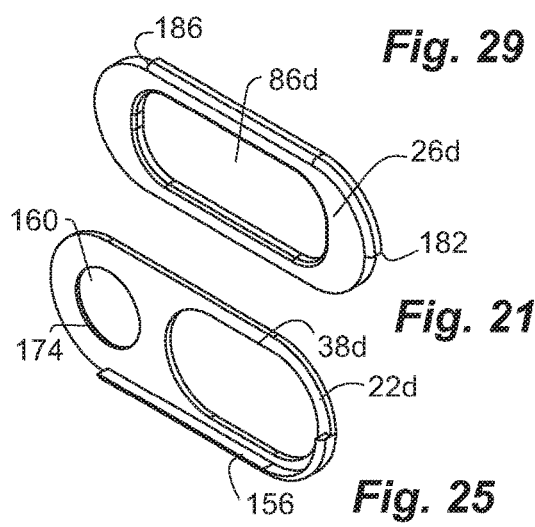
Fig. 21
Fig. 25
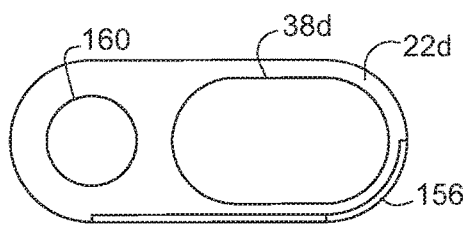
Fig. 26
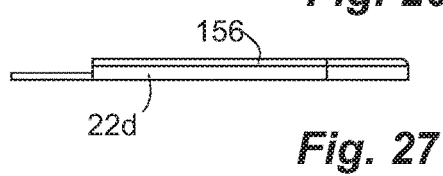
Fig. 27
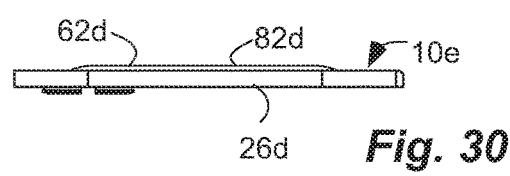
Fig. 30

PRIVACY SHUTTER FOR COMPUTER CAMERA WITH FINGER GRIP

PRIORITY CLAIM(S)

This is a continuation-in-part of U.S. patent application Ser. No. 15/837,778, filed Dec. 11, 2017; which is hereby incorporated herein by reference.

This claims priority to U.S. Provisional Patent Application Ser. No. 62/665,025, filed May 1, 2018, which is hereby incorporated herein by reference.

BACKGROUND

Field of the Invention

The present invention relates generally to a privacy shutter to selectively cover a lens of a computer camera.

Related Art

Cameras are routinely included on computers, such as laptops, to allow for live video transmission. Privacy concerns continue to grow with respect to unintended video capture or malicious access to the camera.

SUMMARY OF THE INVENTION

It has been recognized that it would be advantageous to develop a privacy shutter to selectively cover and expose a camera lens of a camera.

The invention provides a privacy shutter to selectively cover and expose a camera lens on a computer. The shutter comprises a frame with an inner side configured to be affixed to a surface adjacent the camera lens on the computer device. A screen is movably coupled to the frame and movable with respect to frame between: 1) a closed position, and 2) and open position. In the closed position, the screen is disposed in a first position with respect to the frame and is configured to be disposed over the camera lens of the computer device. In the open position, screen is disposed in a different second position with respect to the frame and is configured to expose the camera lens of the computer device. In one aspect, a fingertip grip is coupled to the screen and comprises a low-profile dome having a broad width greater than a height thereof and a perimeter edge with a fillet. In another aspect, a low-profile dome is carried by the frame or the screen, and has a broad width greater than a height thereof and a perimeter edge with a fillet. The dome is at least translucent, and indicium is disposed underneath the dome and visible therethrough.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 15 is an exploded perspective view of the privacy shutter of FIG. 9;

FIG. 16 is a front view of a frame of the privacy shutter of FIG. 9;

FIG. 17 is a side view of the privacy shutter of FIG. 9;

FIG. 18 is a side view of another privacy shutter in accordance with another embodiment of the present invention;

FIG. 19 is a front view of another privacy shutter in accordance with another embodiment of the present invention, shown in a closed or privacy position;

FIG. 20 is a front view of the privacy shutter of FIG. 19, shown in the open or use position;

FIG. 21 is a perspective view of a screen of the privacy shutter of FIG. 19;

FIG. 22 is a front view of the screen of FIG. 21;

FIG. 23 is a side view of the screen of FIG. 21;

FIG. 24 is a back view of the screen of FIG. 21;

FIG. 25 is a perspective view of the frame of the privacy shutter of FIG. 19;

FIG. 26 is a front view of the frame of FIG. 25;

FIG. 27 is a side view of the frame of FIG. 25;

FIG. 28 is a cross-sectional side view of the screen of FIG. 21, taken along line 28 of FIG. 24;

FIG. 29 is a detailed cross-sectional side view of the screen of FIG. 21, taken along line 29 of FIG. 28;

FIG. 30 is a side view of another screen of the privacy shutter of FIG. 19 in accordance with another embodiment of the present invention;

Figure 1:
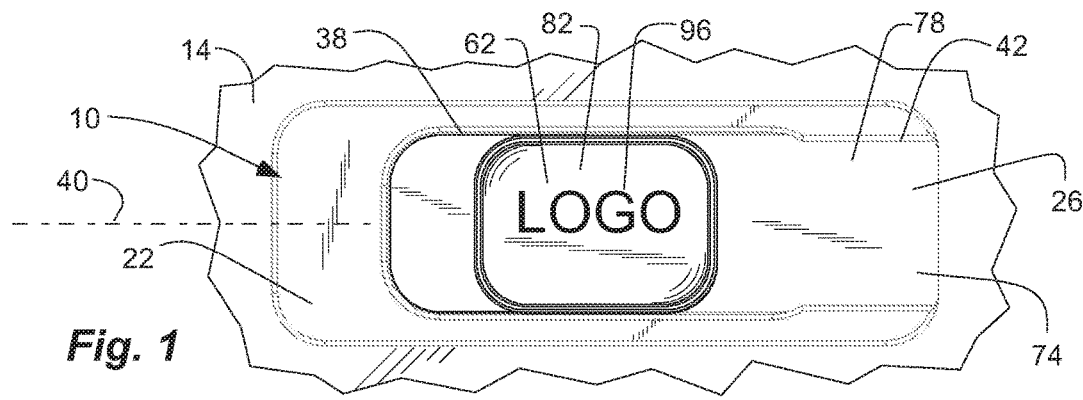
FIG. 1 is a front view of a privacy shutter in accordance with an embodiment of the present invention, shown in a closed or privacy position.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

Unless otherwise specified, the terms "computer" and "computer device" are used interchangeably here to broadly refer to an electronic device, including by way of example, a monitor of a desktop computer, a laptop computer, a cellular (cell) phone, a smart phone, a tablet computer or tablet, a phablet, and the like. Such a device can have a display screen upon which data, information, media, etc. is viewed; one or more inputs, such as buttons, a touch screen, etc.; one or more outputs, such as the screen, a speaker, an audio jack, etc.; one or more cameras; a power supply, such as a battery; a data storage system and a computing system. Such a device can also include a port or socket for receiving a power and/or data connection cord or plug. The device can have a back or back surface, and a front or front surface. The cameras can be disposed on the front, or the back, or both. The display or touch screen can occupy a great majority of the front of the device. The device can be mobile and transportable, such as in the case of a laptop computer, a tablet and a cell phone. The portable electronic device can be carried by a user, such as in a pocket or purse, and also can be held in the user's hand(s).

Unless otherwise specified, the terms "mobile device", "cellular phone" and "cell phone" are used interchangeably herein to broadly refer to a cellular phone, a cell phone, a smart phone, phablet, etc. Such cellular phones can be portable, handheld communication devices, or mobile devices, that can include a speaker, a microphone, one or more cameras, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone.

In addition, unless otherwise specified, the terms "computer", "computer device", "mobile device", "cellular phone" and "cell phone" are intended to refer to such devices with a case, cover, skin, film, etc. thereon. Cell phones often are used with a case that surrounds the sides and back of the phone. In addition, cell phones can be utilized with skins that adhere or stick to the back and/or sides of the phone. In addition, cell phones can have a film or screen protector that adhere or stick to the front or screen of the phone. Unless otherwise specified, the terms "computer", "computer device", "mobile device", "cellular phone" and "cell phone" are used herein to also refer to such cases or skins. Thus, a description of an item being attached to, affixed to, carried by, and the like, the cell phone or back thereof is intended to include being attached to, affixed to, carried by, and the like, the case or skin or back thereof. Furthermore, the terms "back surface" and "back" are used interchangeably for such mobile devices or cellular phones, and are intended to refer to the actual back or back surface of such devices, and the back or back surface of any case, cover, skin, film, etc. disposed thereon.

The terms "indicium" and "indicia" are used interchangeably herein, unless otherwise noted.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both. The indicium can be indicative of such a business, and can comprise a name, logo, slogan, trademark, service mark, etc.

DESCRIPTION

A privacy shutter is presented that can be adhered to a surface of a computer, cell phone or tablet, and adjacent or surrounding a camera lens thereof. The privacy shutter can selectively cover and expose the camera lens. The shutter can be thin to accommodate a thin gap between a display and a keyboard of a laptop computer when folded. Similarly, the shutter can be thin to avoid interference with operation and use of a cellular phone. In addition, the shutter can be small to accommodate the limited space surrounding the camera lens. In addition, the shutter can present a surface for indicium. The shutter can be configured to present the indicium at all times without covering or obscuring the indicium. Furthermore, the shutter can provide a fingertip grip to enable engagement of the fingertip with the small, thin shutter. The fingertip grip can be raised and convex, can be tacky, and/or can provide the indicium.

As illustrated in FIGS. 1-8, a privacy shutter, indicated generally at 10, in an example implementation in accordance with the invention is shown for selectively covering and exposing a camera lens 14 on a computer device 18. The privacy shutter 10 has a frame 22 and a screen 26 carried by the frame 22. The frame 22 has an inner side 30 (FIG. 5) with at least a portion of affixed to a surface adjacent to, or surrounding, or both, the camera lens 14 on the computer device 18. In addition, the frame 22 has an outer side 34 (FIG. 4) opposite the inner side 30. In one aspect, the frame 22 can have and can define an aperture 38 is disposed in the frame 22 and circumscribed by the frame 22. The frame 22 can be positioned with respect to the camera lens 14 so that the aperture 38 is aligned with, exposes, and circumscribes the camera lens 14. The frame 22 can be thin. In one aspect, the frame 22 and the shutter 10 can have a thickness between the inner and outer sides 30 and 34 less than 0.1 inches (2.5 mm) in one aspect, less than 0.08 inches (2 mm) in another aspect, and approximately 0.06 inches (1.5 mm) in another aspect. The frame 22 and the shutter 10 can be elongated, and can have a length along a longitudinal axis 40 longer than a width thereof.

Figure 6:
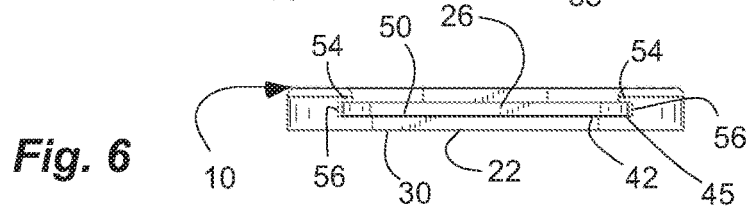
FIG. 6 is an end view of the privacy shutter of FIG. 1, shown in the closed or privacy position.
Figure 7:
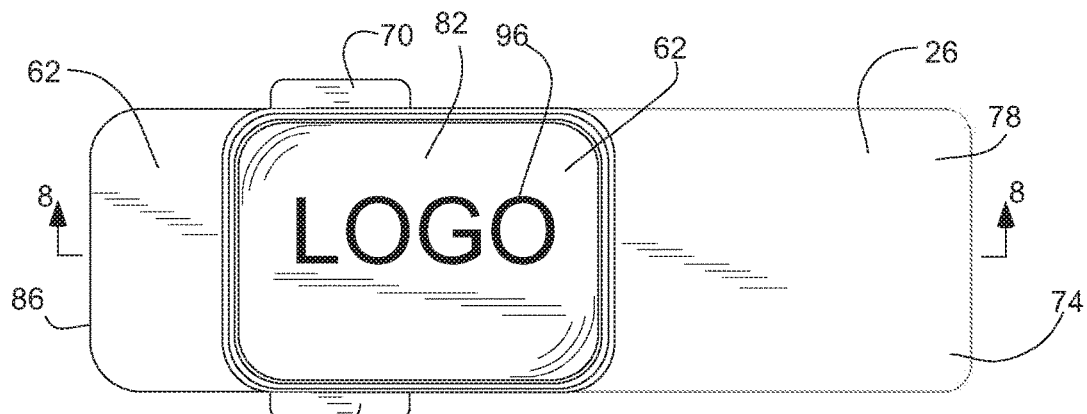
FIG. 7 is a front view of a screen of the privacy shutter of FIG. 1.
Figure 8:
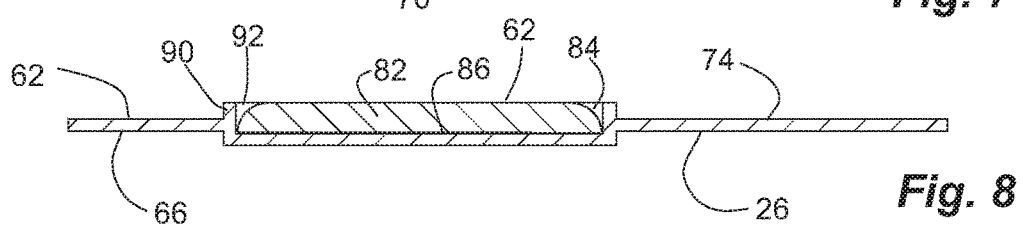
FIG. 8 is a cross-sectional side view of the screen of FIG. 7, taken along line 8 of FIG. 7.
Figure 9:
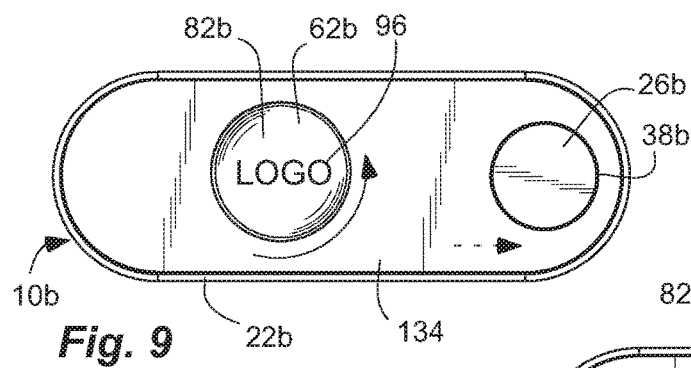
FIG. 9 is a front view of another privacy shutter in accordance with another embodiment of the present invention, shown in a closed or privacy position.
Figure 10:
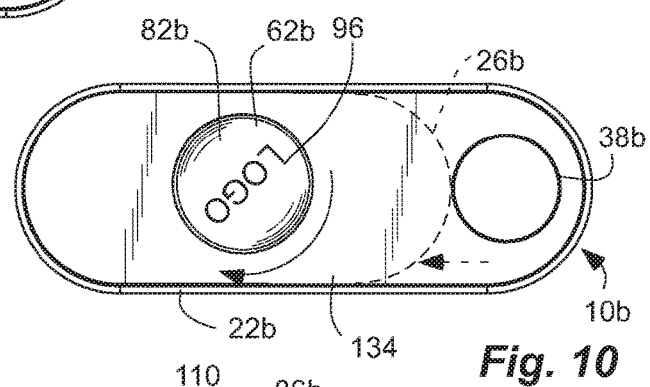
FIG. 10 is a front view of the privacy shutter of FIG. 9, shown in the open or use position.
Figure 11:
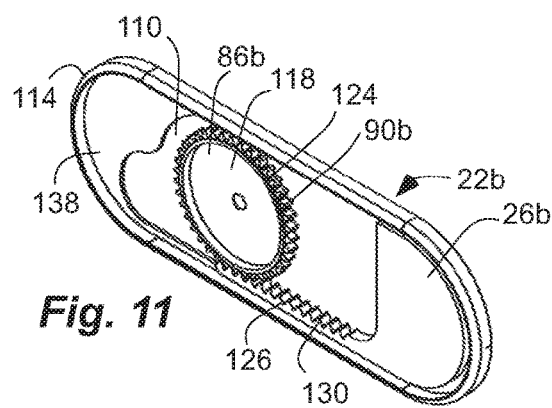
FIG. 11 is a perspective view of the privacy shutter of FIG. 9, shown with a cover removed and shown in the closed or privacy position.
Figure 12:
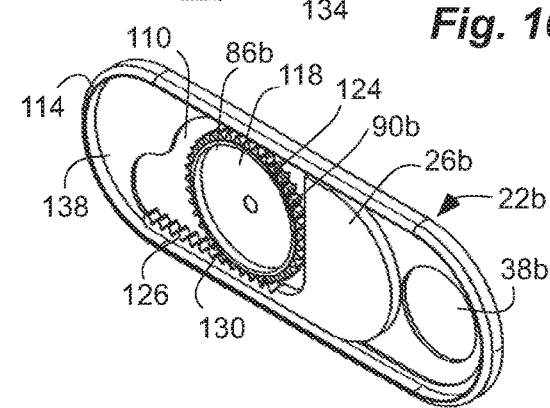
FIG. 12 is a perspective view of the privacy shutter of FIG. 9, shown with the cover removed and shown in the open or use position.
Figure 13:
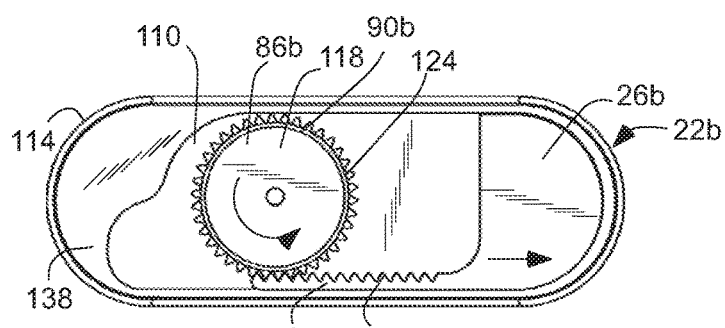
FIG. 13 is a front view of the privacy shutter of FIG. 9, shown with the cover removed and shown in the closed or privacy position.
Figure 14:
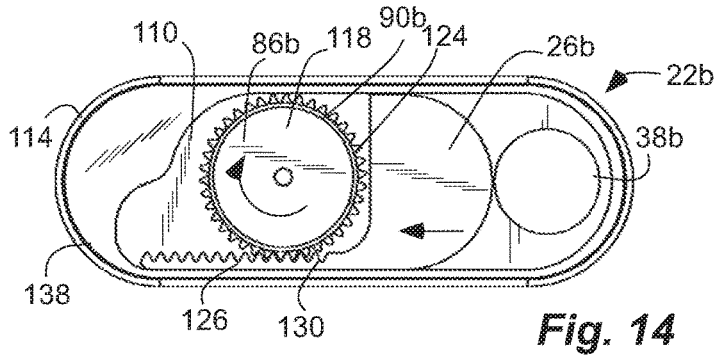
FIG. 14 is a front view of the privacy shutter of FIG. 9, shown with the cover removed and shown in the open or use position.
Figure 31:
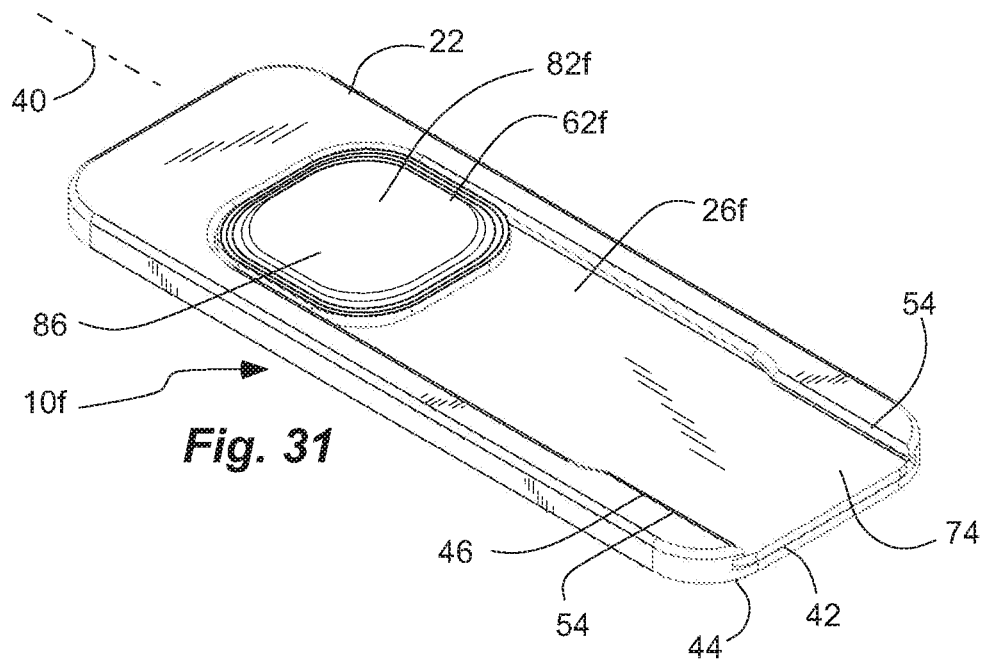
FIG. 31 is a perspective view of another privacy shutter in accordance with an embodiment of the present invention, shown in a closed or privacy position.
Figure 32:
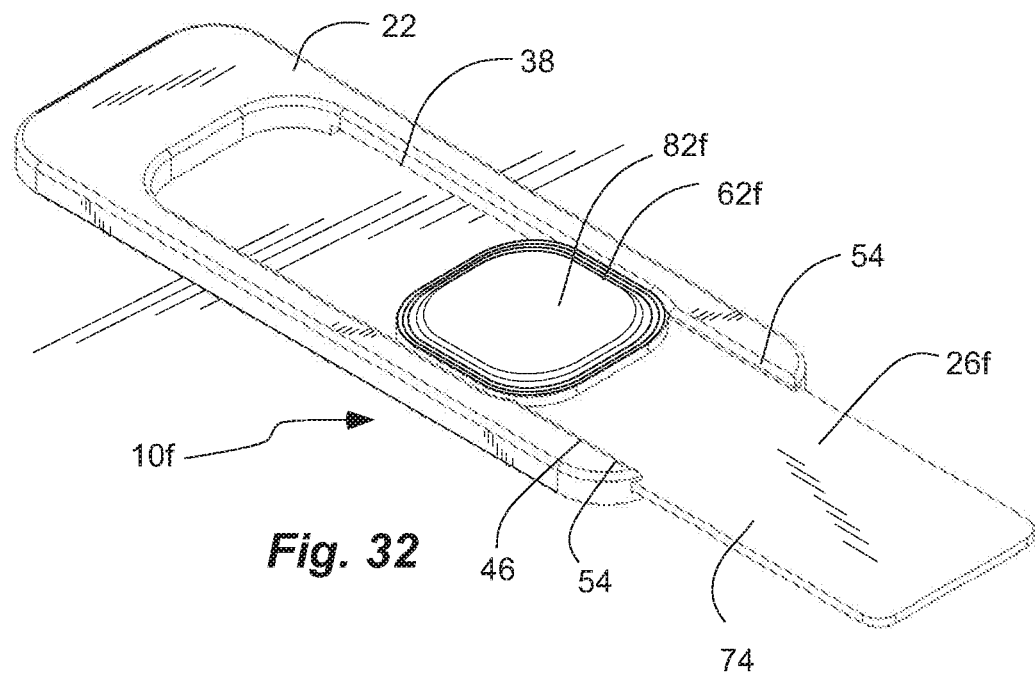
FIG. 32 is a perspective view of the privacy shutter of FIG. 31, shown in the open or use position.
Figure 33:
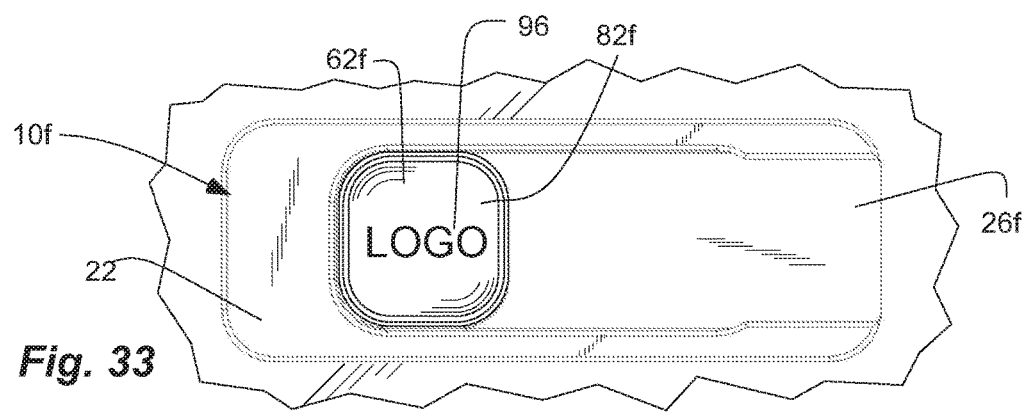
FIG. 33 is a front view of the privacy shutter of FIG. 31, shown in a closed or privacy position.
Figure 34:
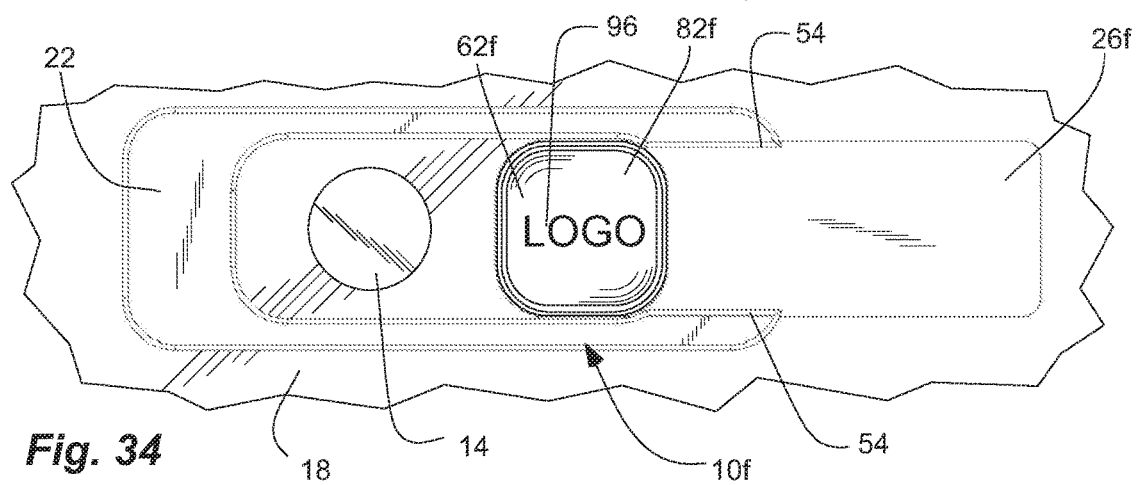
FIG. 34 is a front view of the privacy shutter of FIG. 31, shown in the open or use position.
Figure 35:
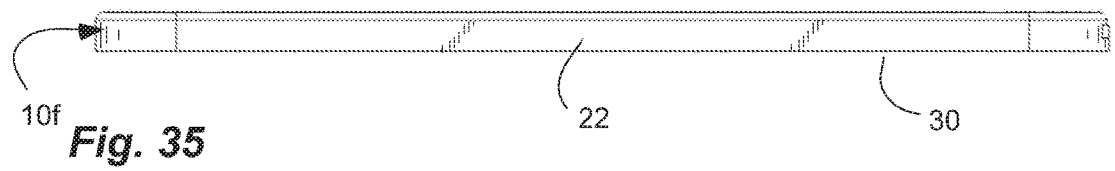
FIG. 35 is a side view of the privacy shutter of FIG. 31.
Figure 36:
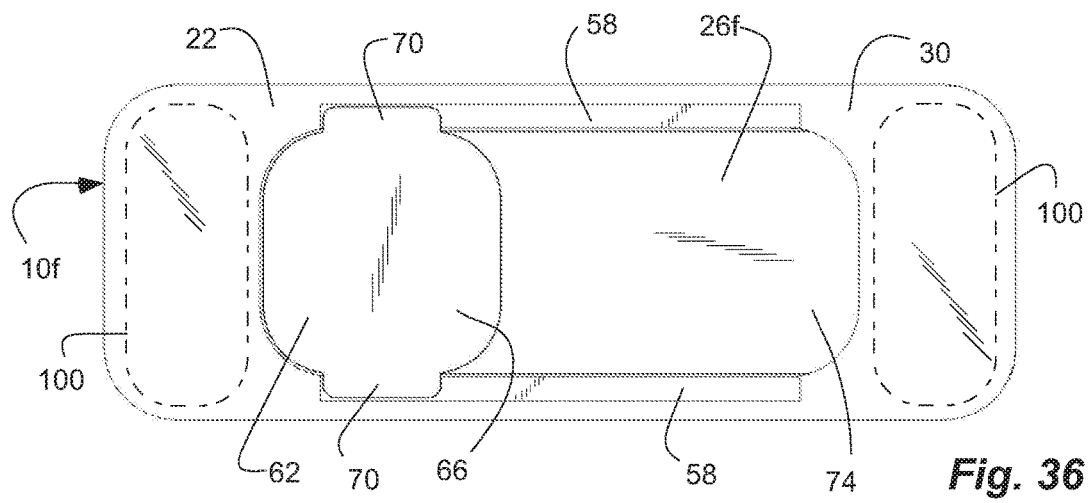
FIG. 36 is a back view of the privacy shutter of FIG. 31, shown in the closed or privacy position.
Figure 37:
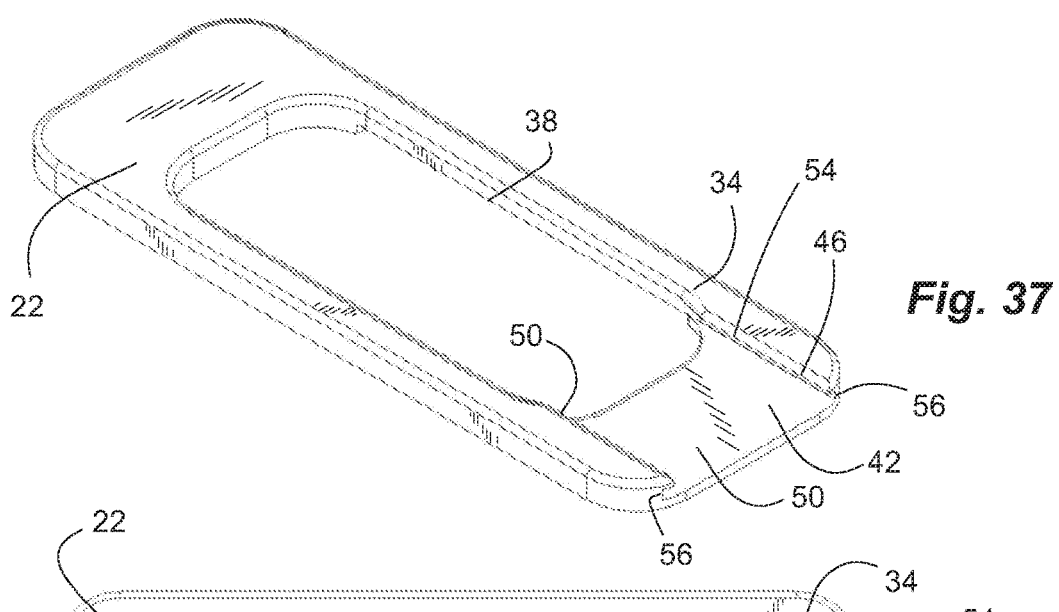
FIG. 37 is a front perspective view of the frame of the privacy shutter of FIG. 31.
Figure 38:
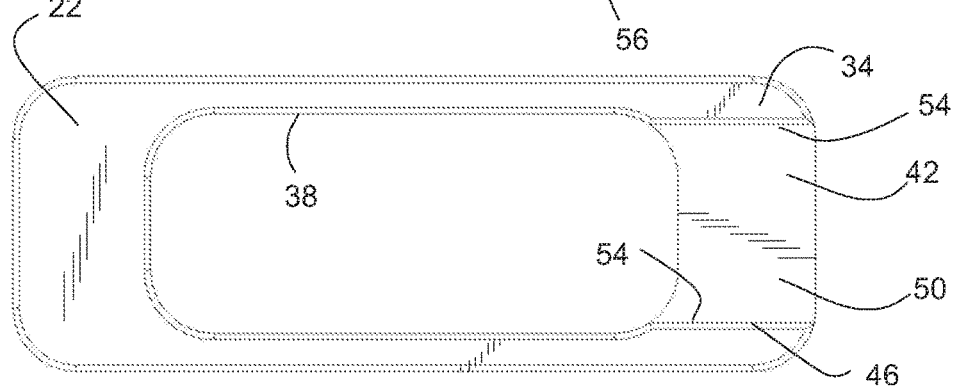
FIG. 38 is a front view of the frame of the privacy shutter of FIG. 31.
Figure 39:
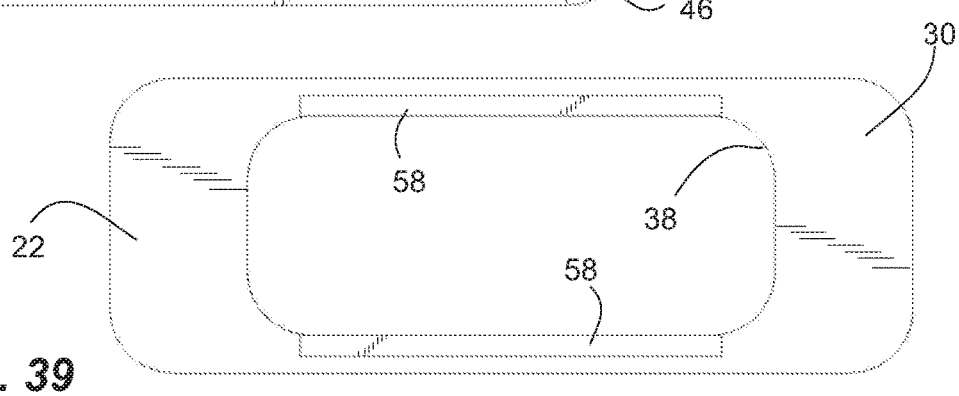
FIG. 39 is a back view of the frame of the privacy shutter of FIG. 31.
Figure 40:
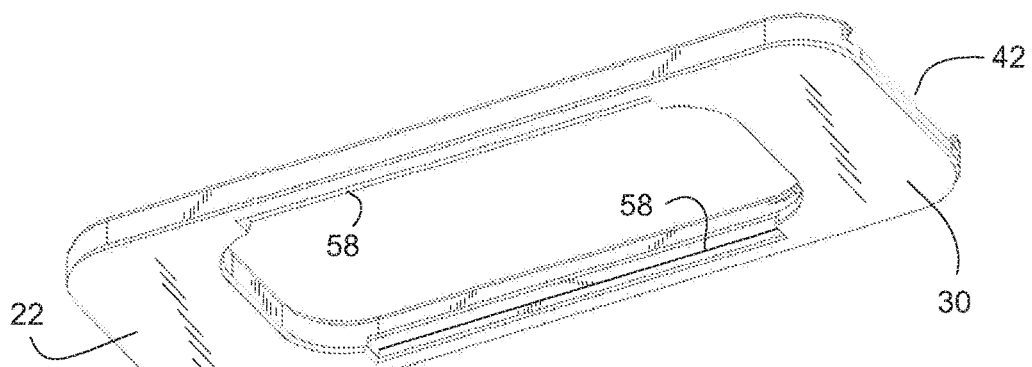
FIG. 40 is a back perspective view of the frame of the privacy shutter of FIG. 31.
Figure 41:
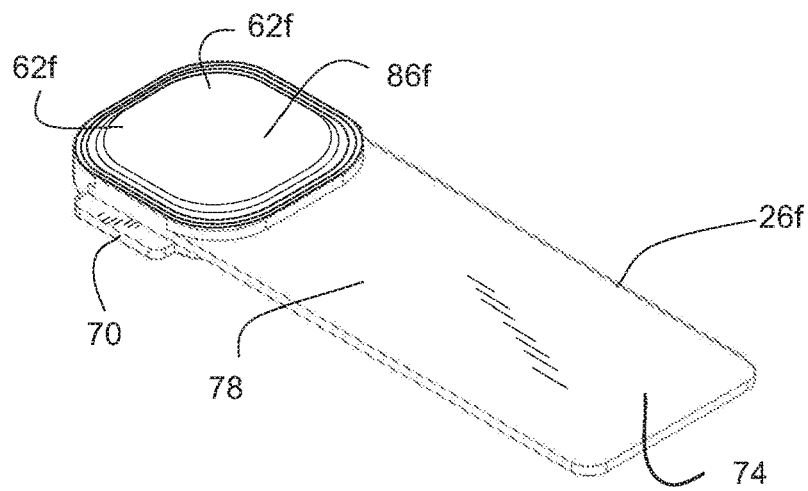
FIG. 41 is a front perspective view of the screen of the privacy shutter of FIG. 31.
Figure 42:
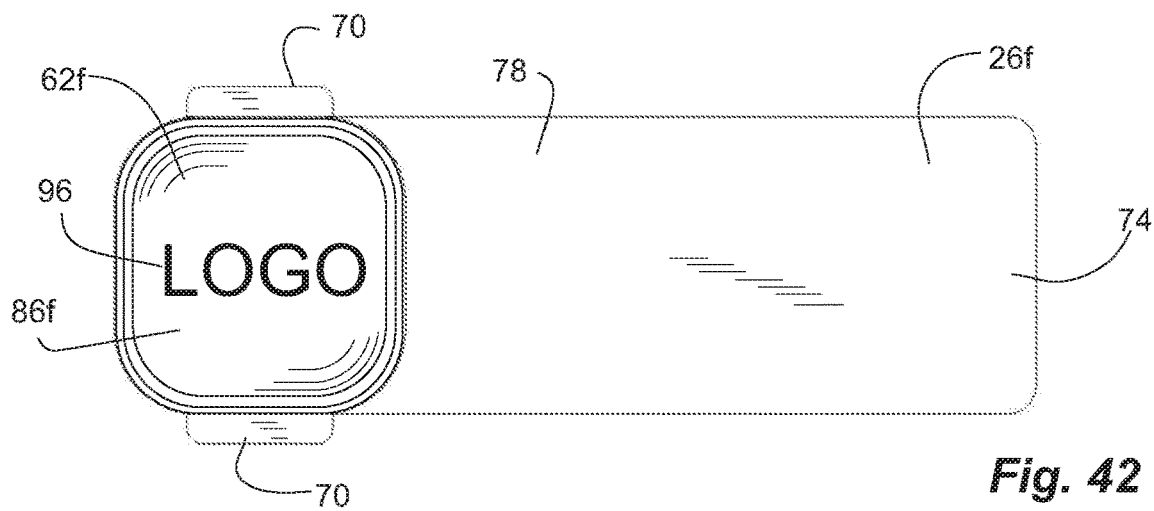
FIG. 42 is a front view of the screen of the privacy shutter of FIG. 31.
Figure 43:
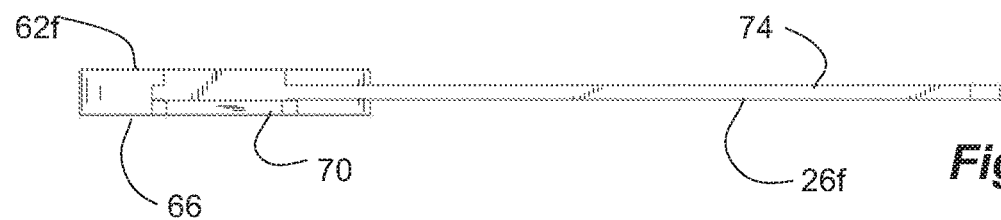
FIG. 43 is a side view of the screen of the privacy shutter of FIG. 31.
Figure 44:
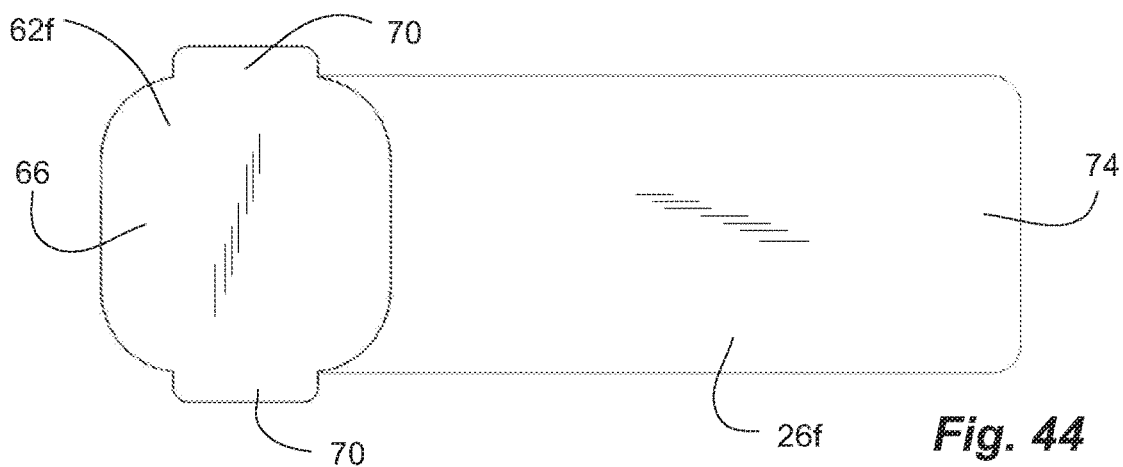
FIG. 44 is a back view of the screen of the privacy shutter of FIG. 31.
Figure 45:
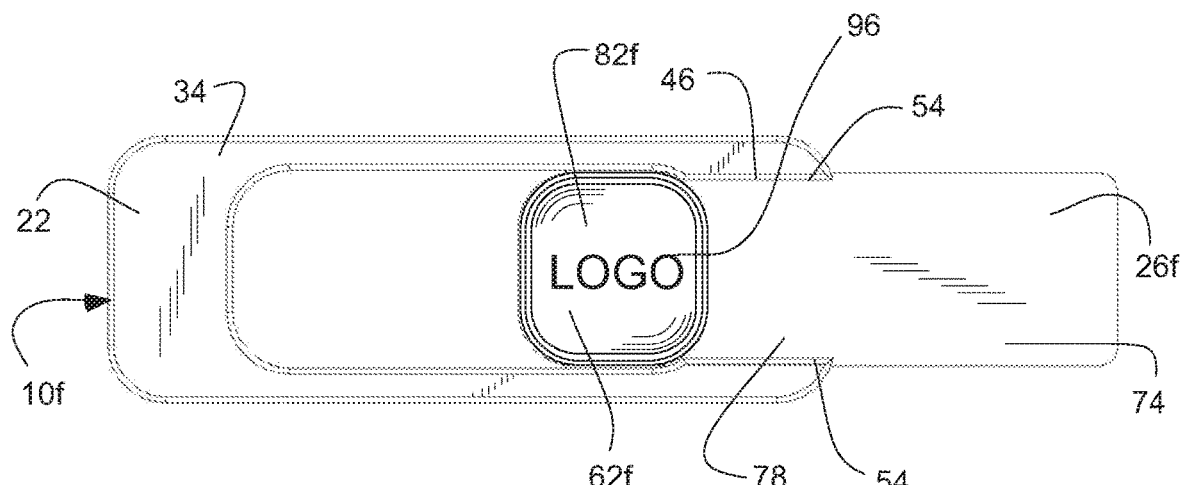
FIG. 45 is a front view of the privacy shutter of FIG. 31, shown in the closed or privacy position.
Figure 46:
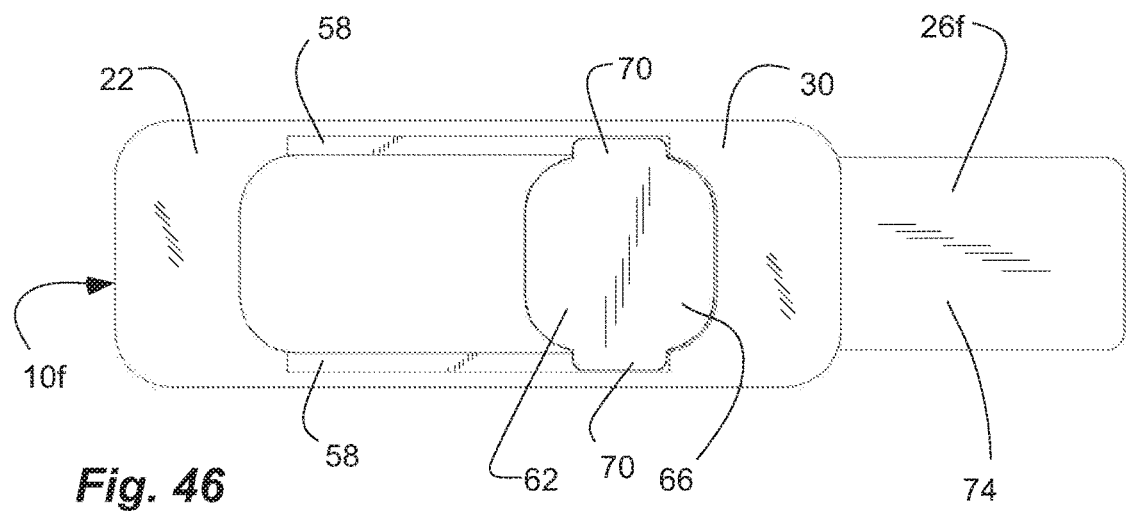
FIG. 46 is a back view of the privacy shutter of FIG. 31, shown in the open or use position.

A channel 42 (FIG. 4) is disposed in the outer side 34 of the frame 22 and extends laterally from the aperture 38 to a perimeter 44 of the frame. Thus, the channel 42 has opposite open ends with one open end in the aperture 38 and another open end 45 (FIG. 6) in the perimeter 44, as shown in FIG. 6. The channel 42 can be formed in a perimeter side of the frame 22, at one end of the frame with respect to the longitudinal axis 40. The channel 42 can be aligned with a long axis or longitudinal axis 40 of the frame 22. The channel 42 has an outer opening 46 (FIG. 4) in the outer side 34 of the frame 22, and an inner cavity 50 in the frame 22. The outer opening 46 faces outwardly along with the outer side 34. The outer opening 46 is narrower than the inner cavity 50, forming opposite and/or opposing lips 54 extending over the inner cavity 50 of the channel 42. Thus, the outer opening 46 has a width between the lips 54, and orthogonal to the longitudinal axis 40. In one aspect, the width of the outer opening 46 can be less than a width of the aperture 38 of the frame 22, with the width of the aperture 38 parallel with the width of the outer opening 46, and orthogonal to the longitudinal axis 40. The lips 54 of the channel 42 can form opposing grooves 56 (FIG. 6) that face one another across the channel 42. In one aspect, the grooves 56 extend along a length of the channel 42 parallel with the longitudinal axis 40 and between the aperture 38 and the perimeter side, but not along the aperture 38 itself.

In addition, a pair of slots 58 (FIG. 5) are formed in the inner side 30 of the frame 22 on opposite sides of the aperture 38, forming a track. The slots 58 are open to the aperture 38 and extend along opposite sides thereof along a length of the slot 38 parallel with the longitudinal axis 40. In addition, the slots 58 are open to or through the inner side 30. The slots 58 can have a cross-sectional profile, perpendicular to the longitudinal axis 40, with one side and a bottom formed by the frame 22, and the other side formed by the surface of the computer device 18 when affixed thereto. The slots 58 can oppose one another and can have openings that face one another across the aperture 38.

Figure 5:
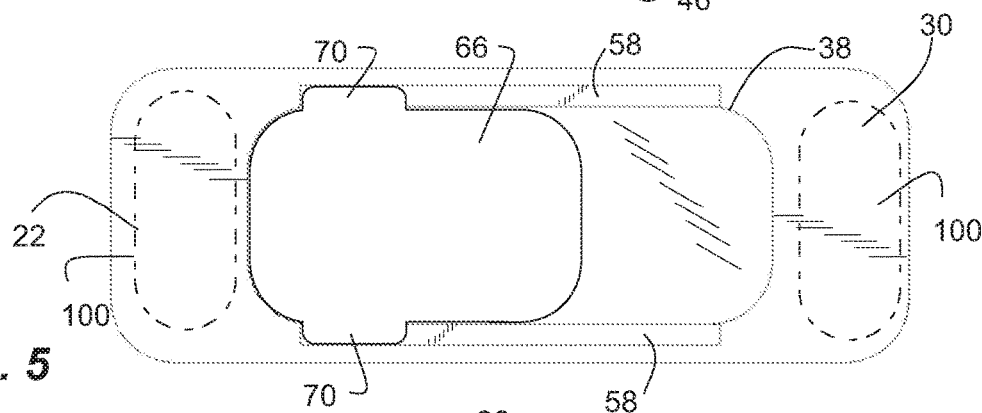
FIG. 5 is a rear view of the privacy shutter of FIG. 1, shown in the closed or privacy position.

The screen 26 can be movably with respect to the frame 22 and movably carried by the frame 22. In one aspect, the screen 26 can be a slider slidably carried by the frame 22. In addition, the screen 26 is movably and/or slidably with respect to the aperture 38. The screen 26 has a fingertip grip 62 coupled to the screen 26 and carried by the screen 26. The fingertip grip 62 can be movably and/or slidably disposed in the aperture 38 of the frame 22. The fingertip grip 62 can remain in the aperture 38 as it moves and/or slides therein, and as the screen 26 moves and/or slides. The fingertip grip 62 or the screen 26 has an inner surface 66 (FIG. 5) that can be flush with the inner side 30 of the frame 22, and that can abut to and slide against the surface of the computer device 18. Because the inner surface 66 of the fingertip grip 62 can abut to the surface of the computer device 18, force applied to the fingertip grip 62 can bear against the computer device 18 and not the frame 22. In addition, the fingertip grip 62 is contained within a perimeter of the frame 22. Thus, force applied outside of the frame can be reduced to reduce the risk of inadvertently dislodging the shutter 10 from the computer device 18. A pair of tabs 70 extend from opposite sides of the fingertip grip 62 or the screen 26 and into the pair of slots 58, respectively, as shown in FIG. 5. The pair of tabs 70 is slidable in the pair of slots 58 as the screen 26 slides. The pair of tabs 70 are held between the frame 22 and the computer device 18. The pair of tabs 70 retain the fingertip grip 62 and at least part of the screen 26 in the aperture 38, and resist the fingertip grip 62 and at least part of the screen 26 from coming out of the aperture 38.

Figure 2:
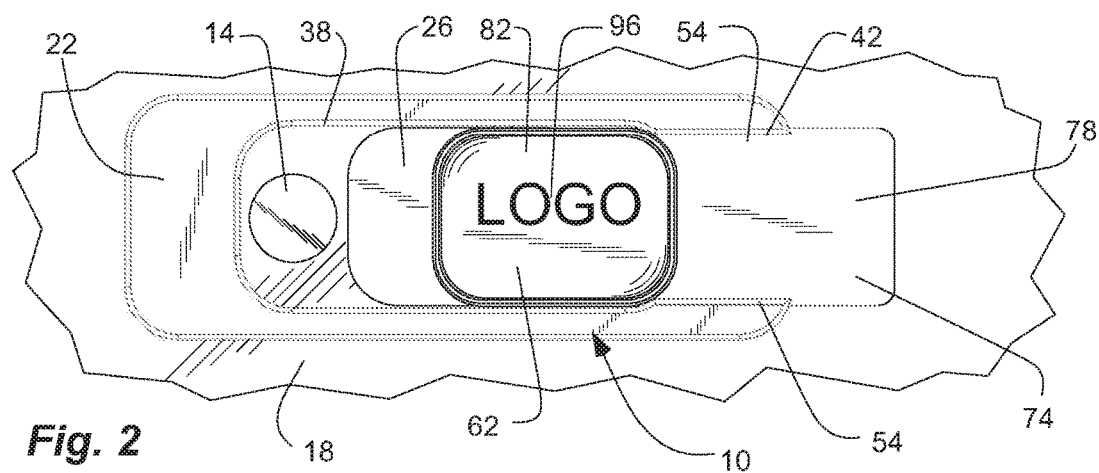
FIG. 2 is a front view of the privacy shutter of FIG. 1, shown in the open or use position.

In addition, the screen 26 has a flap 74 (FIGS. 7 and 8) that extends from the fingertip grip 62 and into the channel 42 of the frame 22, as shown in FIGS. 1 and 2. The flap 74 is slidable in the channel 42 and between the lips 54 and in the grooves 56, with the lips 54 and the grooves 56 slidably retaining the flap 74 in the channel 42. The lips 54 resist the flap 74 from coming out of the outer opening 46 of the channel 42. The flap 74 and the screen 26 have an outer surface 78 that is exposed in the outer opening 46 of the channel 42, and between the lips 54 of the channel 42. The flap 74, or at least a portion thereof, remains in the channel 42, and over a portion of the frame 22, while a portion of the screen 26 or the flap 74 can extend out of the aperture 38 and beyond the perimeter 44 of the frame 22, and out of the open end 45. Thus, a portion of the screen 26 or the flap 74 remains over the frame 22 at the channel 42. The screen 26 is held at two separate and distinct points, namely the fingertip grip 62, or portion of the screen 26 in the aperture 38, being held in the aperture 38 with the tabs 70 thereof held in the slots 58, and the flap 74 held in the channel 42 and in the grooves 56 thereof. Thus, the screen 26 can be held firmly, and sliding motion of the slider can be smooth, and binding resisted, due to the two points of retention. In addition, the screen 26 is held from opposite sides of the frame 22 with the tabs 70 in the slots 58 on the inner side 30, and the flap 74 in the grooves 56 on the outer side 34. In one aspect, the flap 74 of the screen 26 is held only by the lips 54 and in the grooves 56, and not in the aperture 38, to facilitate assembly of the screen 26 with the frame 22. For example, the flap 74 of the screen 26 can be inserted into the aperture 38 from the back and into the grooves 56, and the fingertip grip 62 inserted into the aperture 38 with the tabs 70 in the slots 58, because the width of the channel 42 between the lips 54 are narrower than the width of the aperture 38, and because the grooves 56 only extend along the channel 42, and not into the aperture 38.

The screen 26 is movable or slidable with respect to the frame 22 and the aperture 38 between an open or use position, and a closed or privacy position. In the closed or privacy position, the screen 22 or at least a portion thereof is disposed across the aperture 38 of the frame 22, and disposed over the camera lens 14 of the computer device 18, as shown in FIG. 1. In one aspect, the screen 22 can be disposed across the entire aperture 38, and can span the aperture 38, as shown. In another aspect, the screen 22 can be disposed across a portion of the aperture 38 of the frame 22 corresponding to the camera lens 14 of the computer device 18. The fingertip grip 62 is disposed in the aperture 38 of the frame 22 in the closed position. Similarly, the flap 74, or a portion thereof, is disposed in the aperture 38 of the frame 22 in the closed position, while the remaining portion of the flap 74 is disposed in the channel 42. The screen 26 can be characterized as being disposed in the aperture 38 in the closed position. In one aspect, the entire screen 26, including the fingertip grip 62 and the flap 74, can be contained within a perimeter of the frame 22 in the closed position, thus reducing the risk of a portion of the screen 26 becoming snagged during use. The fingertip grip 62 remains in the aperture 38 in both the open and the closed positions. A distal end of the flap 74, opposite the fingertip grip 62, is disposed in the channel 46 and over a portion of the frame 22 in the closed position.

Figure 3:
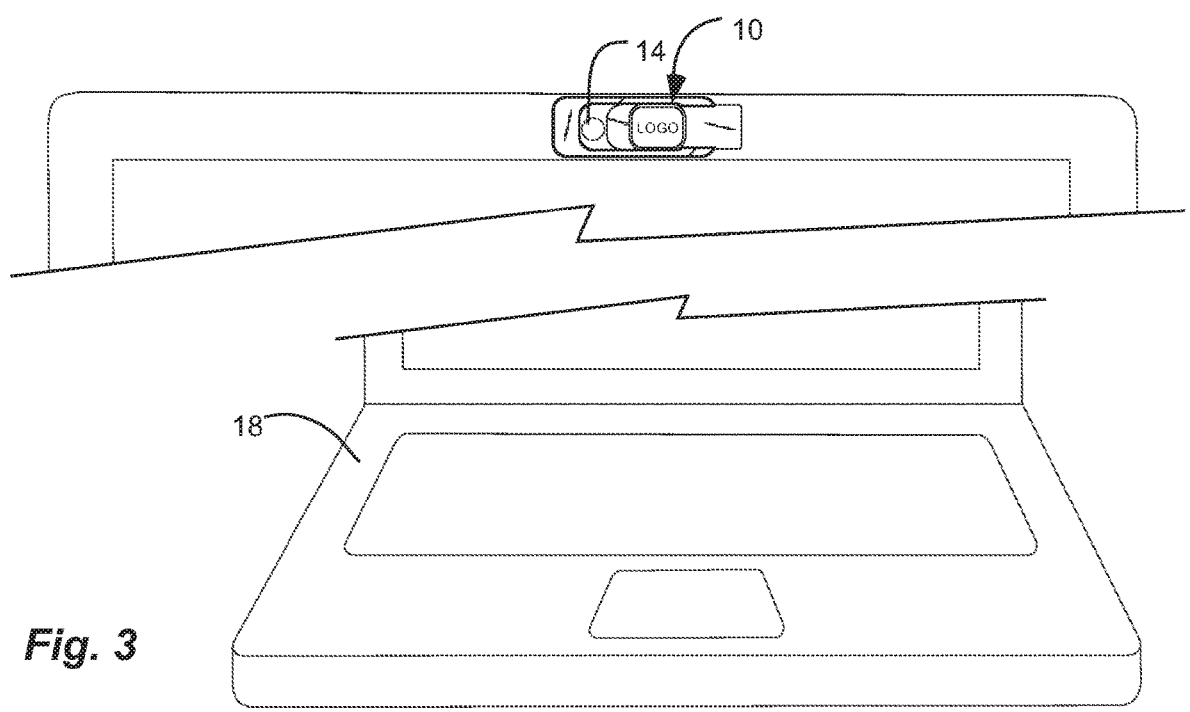
FIG. 3 is a schematic view of the privacy shutter of FIG. 1, shown in the open or use position on a computer.
Figure 4:
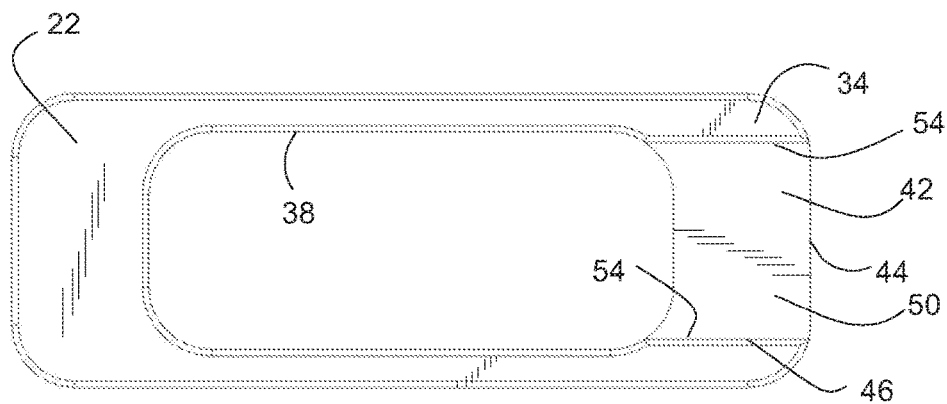
FIG. 4 is a front view of a frame of the privacy shutter of FIG. 1.

In the open position, the screen 22 and the flap 74 and the fingertip grip 62 expose the aperture 38 of the frame 22, and expose the camera lens 14 of the computer device 18, as shown in FIGS. 2 and 3. A portion of the screen 26 or the flap 74 extends beyond the perimeter 44 of the frame 22 in the open position. The outer opening 46 of the channel 42 between the lips 54 exposes the outer surface 78 of the screen 26 and the flap 74 in the opened position, as well as the closed position. Thus, indicium, such as a logo, can be disposed on the outer surface 78 of the screen 26 and the flap 74. The indicium is exposed in both the open and the closed positions of the screen 26. In one aspect, the indicium can be disposed between the lips 54, and over the channel 42 of the frame 22 in the open position of the screen 26 and the flap 74.

As described above, the shutter 10 and the screen 26 have a fingertip grip 62. The fingertip grip 62 facilitates engagement between a fingertip and the screen 26 to move or slide the screen 26 between the open and closed positions. The fingertip grip 62 can be configured to enhance engagement. In addition, the fingertip grip 62 can be configured to enhance visibility. Furthermore, the fingertip grip 62 can be configured to carry or present indicium. The fingertip grip 62 can comprise a low-profile or squat dome 82. The dome 82 can have a broad width, greater than a height or thickness thereof, and a perimeter edge with a fillet 84 or radius edge. Thus, the dome 82 can present a convex profile that can press into the skin of the fingertip to form an engagement. In one aspect, the dome 82 can be separate and distinct from the screen 26, but affixed thereto, such as with an adhesive. In addition, the screen 26 can have a cavity 86 (FIG. 8) therein. The cavity 86 can face outwardly with respect to the privacy shutter 10. The cavity 86 can have or can be formed by a lip 90 extending from the screen 26 and substantially circumscribing the cavity 86. The dome 82 can be disposed in the cavity 86. The lip 90 of the cavity 86 can assist in maintaining a position of the dome 82 with respect to the screen 26, along with the adhesive. In one aspect, an outermost portion of the dome 82 can be substantially flush with an outermost surface of the screen 26, or an outermost surface of the frame 22, or both. The outermost surface of the screen 26 can be defined by the lip 90 such that the outermost portion of the dome 82 can be substantially flush with the outermost surface of the lip 90. Thus, the shutter 10 can remain thin as described above. In addition, the fingertip grip 62 can have a thickness substantially the same as the thickness of the frame 22. In addition, the lip 90 can protect the dome 82. A substantially annular gap 92 can be formed between the fillet 84 or radius edge of the dome 82 and the lip 90. A portion of the fingertip can press into the annular gap 92 for form a portion of the engagement. In another aspect, the outermost portion of the dome 82 can be recessed below the outermost portion of the outermost surface of the screen 26, or the outermost surface of the frame 22, or both. In another aspect, the outermost portion of the dome 82 can extend beyond the outermost surface of the screen 26, or outermost surface of the frame 22, or both.

As indicated above, the fingertip grip 62 can also comprise and carry indicium 96. The indicium 96 can be indicative of or represent a business, a product, or both. Thus, the shutter 10 can be used as a promotional product. In one aspect, the dome 82 can be at least translucent. In another aspect, the dome 82 can be substantially transparent. In addition, the indicium 96 can be disposed underneath the dome 82 and visible therethrough. Thus, the indicium 96 can be protected by the dome 82. The indicium 96 can be printed on a layer that is affixed to a bottom of the dome 82 separate from the screen 26 and the shutter 10, and then the dome 82 with the indicium 96 thereon can be affixed to the screen 26 or the fingertip grip 62. For example, the dome 82 can comprise a graphic layer with the indicium 96 thereon disposed between the screen 26 the dome 82. This provides for greater visibility of the indicium 96 and the fingertip grip 82, as opposed to printing directly on the screen 26. In one aspect, the fingertip grip has an exposed surface that is tacky. The tacky quality of the dome 82 can cling to the fingertip, such as by mechanical or specific adhesion. The tacky quality can be provided by a material of the dome 82. For example, the exterior or outermost surface of the dome 82 can comprise a polyurethane to be both tacky and translucent or transparent. In another aspect, the indicium can be disposed on the outermost surface of the dome 82 and the fingertip grip 62. In another aspect, the dome 82 and the fingertip grip 62 can be contoured to increase frictional engagement with the fingertip.

The dome 82 of the shutter 10 can have a domed or semi-spherical exterior surface defining an outermost surface. In one aspect, the indicium 96 can be disposed on the domed or semi-spherical exterior surface. Thus, the indicium 96 can be curved or arcuate, and can be visible from the side.

As stated above, in one aspect, the dome 82 can be a polyurethane dome. The dome 82 can include the adhesive film adhered to an exterior side or surface of the screen 26. The adhesive film can use a chemical adhesive to adhere. The adhesive can be selected to provide sufficient adhesion between the dome 82 and the screen 26 without separating as the shutter 10 is repeatedly used. The adhesive can also be selected so that the dome 82 can be removed if desired. Thus, the adhesive film can include a releasable adhesive, as opposed to a permanent adhesive. The adhesive film can be a repositionable adhesive film releasably and repositionably adhered to the exterior side or exterior surface of the shutter 10. The adhesive film can have an adhesive bond between the dome 82 and the exterior side or exterior surface of the shutter 26. The adhesive film can also have a contact surface between the adhesive film or dome 82 and the exterior side or exterior surface of the screen 26. Furthermore, the adhesive and/or the adhesive film can be substantially transparent, or at least translucent, so that the surface of the exterior side or exterior surface of the screen 26 can be visible through the dome 82 and the adhesive film. The adhesive and/or adhesive film can be a removable 3M Controltac™ adhesive.

The adhesive film can be disposed on a substrate. The substrate can also be a film. In one aspect, the substrate can be substantially non-absorbent. The substrate can provide a surface, such as an upper or inner surface opposite the adhesive that can be printable. In addition, the substrate can be substantially transparent, or at least translucent, so that the surface of the exterior side or exterior surface of the screen 26 can be visible through the dome 82, and the substrate. The substrate can be a printed 3M® graphics vinyl. Alternatively, the substrate can be a polyester film. The substrate can be any laminated (non-porous) substrate, including: polypropylene (PP), polyvinyl chloride (PVC), polyethylene terephthalate (PET), acrylonitrile-butadiene-styrene (ABS), polyester, regular sticker paper, vinyl, or tin metal (foil). Alternatively, the substrate can have be other films with other characteristics, such as reflective, metal shine, textured, etc.

The dome 82 or the outfacing surface thereof can provide a non-slip surface that can engage the fingertip. Thus, the outfacing surface can be sufficiently tacky to cling to the fingertip, but sufficiently smooth or slippery to slide in and out of cases, purses, pockets of clothing and clothing accessories, in the case of a cell phone. The tackiness of the outfacing surface can be obtained through various factors, which can include material, hardness/softness, and coefficient of friction. As described above, the dome 82 can be formed of polyurethane. The polyurethane can be formed by combining a polyol with a catalyst or hardener. In one aspect, the ratio of polyol to catalyst can be between 1:0.63 to 0.85, so that there is more polyol than catalyst. In another aspect, the ratio of polyol to catalyst can be between 1:0.63 to 0.75. Typical polyurethane is obtained by mixing polyol and catalyst in a 1:1 ratio. In addition, in one aspect, the outfacing surface or the dome 158 can have a hardness between 10 and 35 Shore D. In another aspect, the outfacing surface or the dome 158 can have a hardness between 12 and 21 Shore D. In another aspect, the outfacing surface or the dome 118 can have a hardness between 12 and 18 Shore D. Other non-tacky stickers or decals typically can have a hardness of 60 Shore D or harder. Furthermore, the outfacing surface can have a coefficient of friction of between 0.3 and 0.1 in accordance with ASTM D 1894. Thus, the outwardly facing surface can be tacky to cling to the support surface 66, but smooth to facilitate insertion and removal from a pocket or purse, in the case of a cell phone.

A graphic layer can be disposed between the adhesive film and the dome 82, or between the substrate and the dome. The graphic layer can include ink disposed on or printed on the substrate. For example, the graphic layer can be an aqueous based inkjet ink. The graphic layer can include indicium 96, such as a logo, a picture, etc. In addition, the graphic layer can include directions for use, orientation, care, etc. Furthermore, the graphic layer can be or can include other inclusions. The graphic layer can be visible through the dome 82. The graphic layer and/or inclusion can be smaller or can have a smaller size than the substrate and the dome 82 such that the graphic layer and inclusion are surrounded by a perimeter of the dome 82 and the substrate. In one aspect, the graphic layer can include indicium 96 that is indicative of a business, company or organization, such as a name, logo, slogan, trademark, service mark, etc. that is capable of identifying and/or distinguishing the business or company, or product or service, or both, or can otherwise be utilized to market, promote, and/or brand the business or company, or product or service, or both.

The dome 82 can have a thickness between 1-2 mm in one aspect, and 1.2-1.5 mm in another aspect. The thickness of the dome 82 can be dimensionally stable so that the dome is not generally compressible. The dome 82 can have a stiffness with a self-supporting flat layer, yet can be flexible enough to be bent to conform to a curvature of the fingertip grip 62 (if present). In addition, the dome 82 can be elastic to return to its self-supporting flat layer. The dome 82 and the outfacing surface can be substantially solid, flat, smooth and continuous.

The dome 82 can also include inclusions embedded therein. For example, the dome 82 can include a scented material, such as a scented oil, that is permeable through the polyurethane material of the dome. In addition, the dome 82 can be colored and translucent. Furthermore, the dome 82 can include a florescent material.

As discussed above, the dome 82 or the outfacing surface can have a radius perimeter. The dome 82 can be made by pouring the polyurethane material on top of the substrate and graphic layer to form the dome. Thus, the radius perimeter is obtained by individual pouring each dome, without stamping or cutting the dome from a continuous layer. The graphic layer can be printed on the substrate having the adhesive film opposite the graphic layer. The graphic layer can be a discrete graphic contained within the dome 82, as opposed to a continuous graphic.

In another aspect, an adhesive 100 (FIG. 5) can be disposed on the inner side 30 of the frame 22 to adhere the frame 22 to the surface surrounding the camera lens 14 on the computer device 18. The adhesive 100 is disposed on opposite sides of the aperture 38. In addition, the adhesive 100 is disposed on the inner side 30 of the frame 22 opposite the channel 42. Thus, the frame 22 and the shutter 10 can be securely adhered to the computer.

Referring to FIGS. 9-17, another privacy shutter 10*b* is shown that is similar in many respects to that described above, and which description is hereby incorporated herein by reference. The shutter 10*b* utilizes a rack-and-pinion along with a rotating fingertip grip to open and close an aperture with the screen. The shutter 10*b* has a frame 22*b* with an aperture 38*b*. In addition, the frame 22*b* has a recess 110 formed by a perimeter lip 114. The screen 26*b* is slidably disposed in the recess 110 to move between the open and closed positions. A pinion gear 118 is pivotally or rotatably carried by the frame 22*b* and located in the recess 110. In one aspect, the frame 22*b* can have a pivot axle 122 (FIG. 15) with the pinion gear 118 rotatably disposed thereon. In another aspect, the pivot axle can extend from the pinion gear 118 and into a bore in the frame 22*b*. The pinion gear 118 has teeth 124 circumscribing the gear. A rack 126 extends from the screen 26*b* with teeth 130 engaging the teeth 124 of the pinion gear 118. The rack 126 can be located adjacent to an interior of the perimeter lip 114 to guide the sliding movement of the screen 26*b*. Thus, as the pinion gear 118 rotates, the rack 126 and the screen 26*b* slide.

A fingertip grip 62*b* is carried by the pinion gear 118. The pinion gear 118 can have a cavity 86*b* with a lip 90*b* substantially circumscribing the cavity 86*b*. The fingertip grip 62*b* can comprise a low-profile dome 82*b*, as described above, positioned in the cavity 86*b*. The dome 82*b* and the fingertip grip 62*b* can be engaged by a fingertip and rotated to slide the screen 26*b*.

A cover 134 can be positioned over the recess 110 and the frame 22*b* to retain the pinion gear 118 and the screen 26*b* with the rack 126 in the recess. The cover 134 can be located in the recess and within the perimeter lip 114 to maintain the thinness of the shutter 10*b*. The cover 134 can be positioned on, and affixed to, a recessed step 138 or edge inside the recess 110 of the frame 22*b*. In one aspect, the recessed step 138 can substantially circumscribe the recess 110 along with the perimeter lip 114. The cover 134 can have a first recess corresponding to the aperture 38*b* and forming or defining the aperture 38b, and a second recess corresponding to the dome 82b and the fingertip grip 62b. The dome 82b and the fingertip grip 62b can be circular to facilitate rotation. In one aspect, the dome 82b can be flush or below the outermost surface of the cover 134, the perimeter lip 114, or both. In another aspect, the dome 82c can extend beyond the outermost surface of the cover 134, the perimeter lip 114, or both, as shown with shutter 10c in FIG. 18.

Referring to FIGS. 19-27, another privacy shutter 10d is shown that is similar in many respects to those described above, and which description is hereby incorporated herein by reference. The shutter 10d has a screen 26d that pivots or swivels with respect to a frame 22d. The frame 22d has an aperture 38d and a stop 156 (FIG. 25). The stop 156 can comprise a flange extending from the frame 22d at a perimeter, such as a lower edge of the frame 22d.

A pivot, axle and/or hub can be formed between and can couple the screen 26d to the frame 22d. In one aspect, the frame 22d can have a bore 160 (FIG. 25), and the screen 26d can have a shaft 164 (FIGS. 23 and 24) inserted into the bore 160. In one aspect, the bore 160 can be a through bore. In another aspect, the bore 160 can extend only partially through a thickness of the frame 22d. In one aspect, the shaft 164 can formed by a segmented, annular lip 168 extending from the screen 26d. The lip 168 can have a tab 172 (FIG. 29) extending laterally from the lip 168 to engage an undercut 174 (FIG. 25) in the bore 160. Thus, the shaft 164 and bore 160 can form a snap-fit. In another aspect, the screen 26d can have the bore and the frame 22d can have the shaft.

A bottom edge 178 of the screen 26d can abut to the stop 156, or flange thereof, in the closed position, as shown in FIG. 19. In addition, the screen 26d can have a forward tab 182 extending from a profile of the screen 26d that can abut to the stop 156, or forward edge of the flange thereof, in the closed position, also as shown in FIG. 19. Thus, the stop 156, with the flange and/or the edge thereof, stops the screen 26d from pivoting when in the closed position. Both the screen 26d and the frame 22d can have matching profiles so that they are flush in the closed position to resist edges that can inadvertently catch on other objects. The screen 26d can pivot from the closed position to an open position. In one aspect, the screen 26d can pivot 180 degrees with respect to the frame 22d. The screen 26d can also have a rear of aft tab 186 extending from the profile of the screen 26d that can abut to the stop 156, or a rearward edge of the flange thereof, in the open position. In one aspect, the forward tab 182 and the aft tab 186 can be fore and aft edges of the same tab extending from a profile of the screen 26d.

A fingertip grip 62d is carried by the screen 26d. The screen 26d can have a cavity 86d (FIG. 21). The fingertip grip 62d can comprise a low-profile dome 82d, as described above, located in the cavity 86d. In one aspect, an outermost portion of the dome 82d can be substantially flush with an outermost surface of the screen 26d, or an outermost surface of the flange of the stop of the frame 22d, or both, because the dome 82d is recessed in the cavity 86d. The dome 82d and the fingertip grip 62d can be engaged by a fingertip and pivoted to swivel the screen 26d between the open and closed positions. In another aspect, the dome 82d can extend beyond the outermost surface of the screen 26d, or the edge of the stop 156 of the frame 22d, or both, as shown with shutter 10e in FIG. 30.

Referring to FIGS. 31-46, another privacy shutter 10f is shown that is similar in many respects to those described above, and which description is hereby incorporated herein by reference, and which description and illustrated features may apply to examples described above. The shutter 10f has a screen 26f slidably carried by the frame 22. The fingertip grip 62f and the dome 82f can be smaller and positioned differently than that described above with respect to FIGS. 1-7.

Referring to FIGS. 47-52, another privacy shutter 10g is shown that is similar in many respects to those described above, and which description is hereby incorporated herein by reference. The shutter 10g may be particularly useful for use with computer device 18, such as a cellular phone, a laptop computer, or a tablet computer. The shutter 10g has a frame or base 22g with an aperture 38g. The frame 22g can have an elongated, rectangular, annular shape. The frame 22g and the aperture 38g can be sized to surround one or more cameras or camera lenses adjacent one another on the computer device 18. In addition, the frame 22g can have a pair of undercuts or slots 58g opposing one another on opposite sides of the aperture 38g of the frame 22g.

In addition, the shutter 10g comprises a screen 26g that can be a slider slidably coupled to the frame 22g and carried by the frame 22g. The screen 26g has an exposed face 180 and an interior face abutting to the frame 22g or outer surface thereof. In addition, the screen 26g has a pair of separate and discrete tabs 70g spaced-apart from one another and extending from the interior face of the screen 26g and into the pair of undercuts or slots 58g of the frame 22g. The separate and discrete tabs 70g can facilitate manufacture and can facilitate maintaining tolerances during manufacture. The tabs 70g in the undercuts or slots 58g maintain the screen 26g on the frame 22g. In addition, the screen 26g can have a pair of stops 184 extending from the interior face of the screen 26g and positioned on opposite lateral sides of the pair of tabs 70g. The stops 184 can abut to an interior perimeter of the frame 22g or the aperture 38g thereof to limit travel of the frame 22g. One stop 184 can abut to one side of the aperture 38g in the closed position while the other stop 184 can abut to the opposite side of the aperture 38g in the open position. The stops 184 can be separate and discrete from one another, and separate and discrete with respect to the tabs 70g, to facilitate manufacture and to facilitate maintenance of tolerances during manufacture. The location of the stops 184 can be determined independently of the tabs 70g. In addition, the stops 184 can resist the tabs 70g from abutting an end of the pair of undercuts or slots 58g, and thus can resist binding.

The shutter 10g, or the frame 22g and the screen 26g, can be thin to reduce interference with the operation of the computer devices. In one aspect, the shutter 10g can have a thickness less than 2 mm in one aspect, less than 1.5 mm in another aspect, and less than 1.2 mm in another aspect.

In another aspect, the shutter 10g, or the frame 22g and the screen 26g, can have an oblong, rectangular shape with rounded corners to resist snagging. In another aspect, the shutter 10g, or the frame 22g and the screen 26g, can be small to reduce interference with the operation of the mobile device. The frame 22g and the screen 26g can have matching perimeters in the closed position. Thus, the screen 26g conceals or covers the frame 22g in the closed position, and can reduce the accumulation or dust, debris or lint. The frame 22g and the screen 26g can have a length less than approximately 20 mm in one aspect, and less than approximately 19 mm in another aspect, and 18.5 mm in another aspect. The frame 22g and the screen 26g can have a height less than or equal to 8 mm in one aspect. The frame 22g and the screen 26g can have a length and a height with a ratio of approximately 19:8 in one aspect. The frame 22g can have a surface area greater than approximately 100 mm$^2$ in one aspect, while the screen 26g can have a surface area less than approximately 150 mm² in one aspect. In one aspect, the aperture 38g of the frame 22g can have an area less than approximately 50 mm². The frame 22g and the screen 26g can have surface areas with a ratio of 2:3. The frame 22g can have a perimeter width, between the aperture 38g and the perimeter that is continuous between approximately 2.3 to 2.5 mm.

Figure 47:
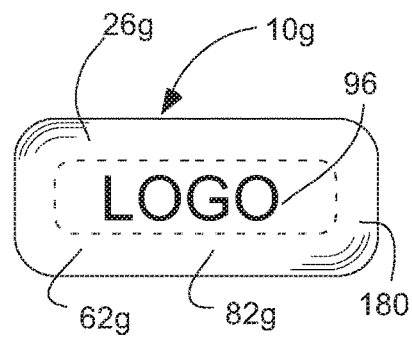
FIG. 47 is a front view of another privacy shutter in accordance with another embodiment of the present invention, shown in a closed or privacy position.
Figure 48:
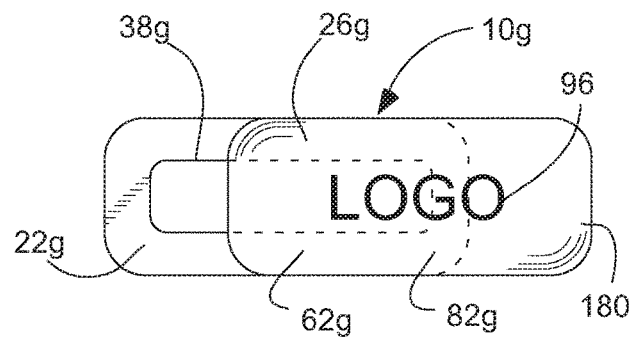
FIG. 48 is a front view of the privacy shutter of FIG. 47, shown in the open or use position.
Figure 49:
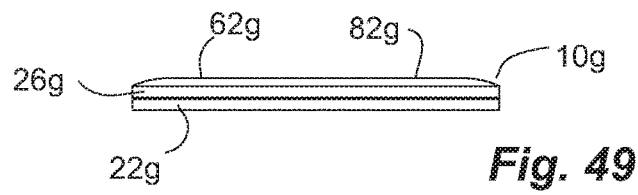
FIG. 49 is a side view of the privacy shutter of FIG. 47.
Figure 50:
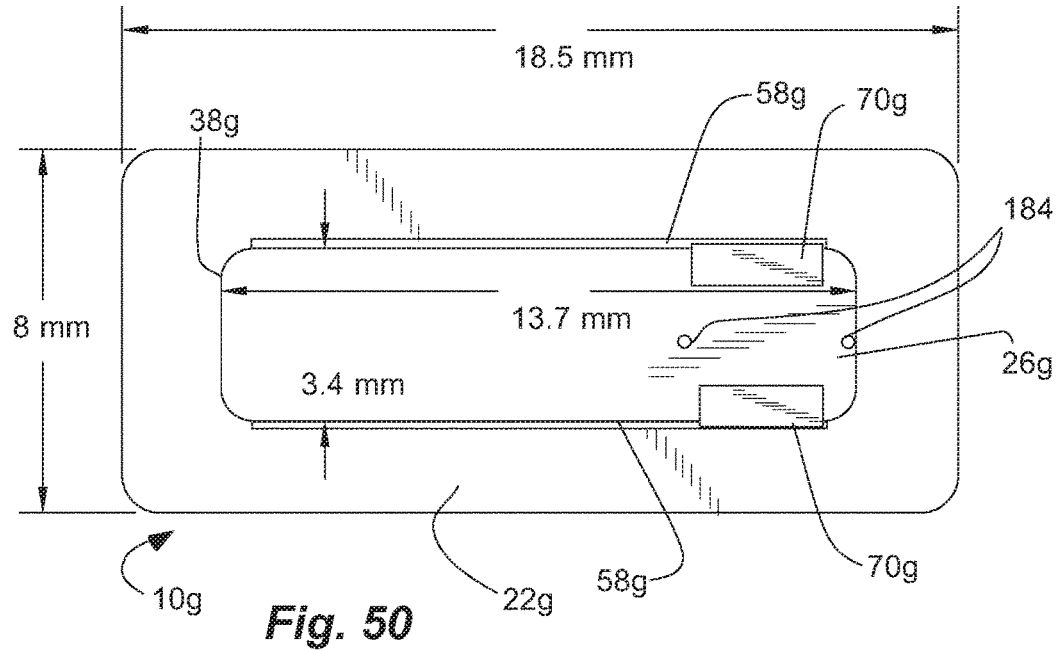
FIG. 50 is a back view of the privacy shutter of FIG. 47, shown in the closed or privacy position.
Figure 51:
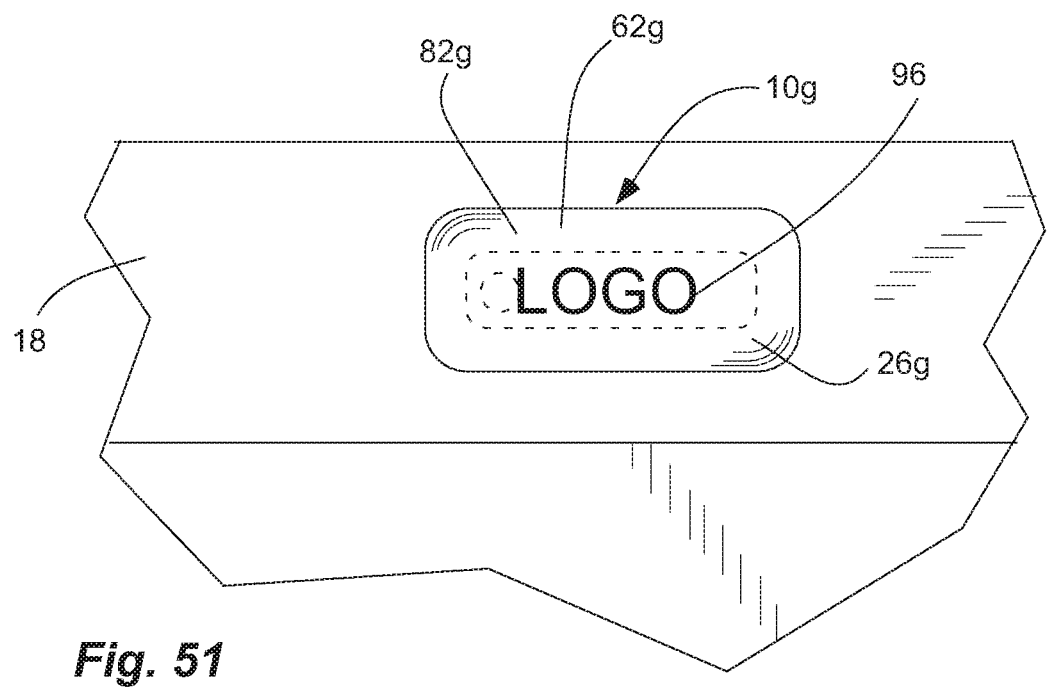
FIG. 51 is a schematic view of the privacy shutter of FIG. 47, shown in the closed or privacy position on a computer.
Figure 52:
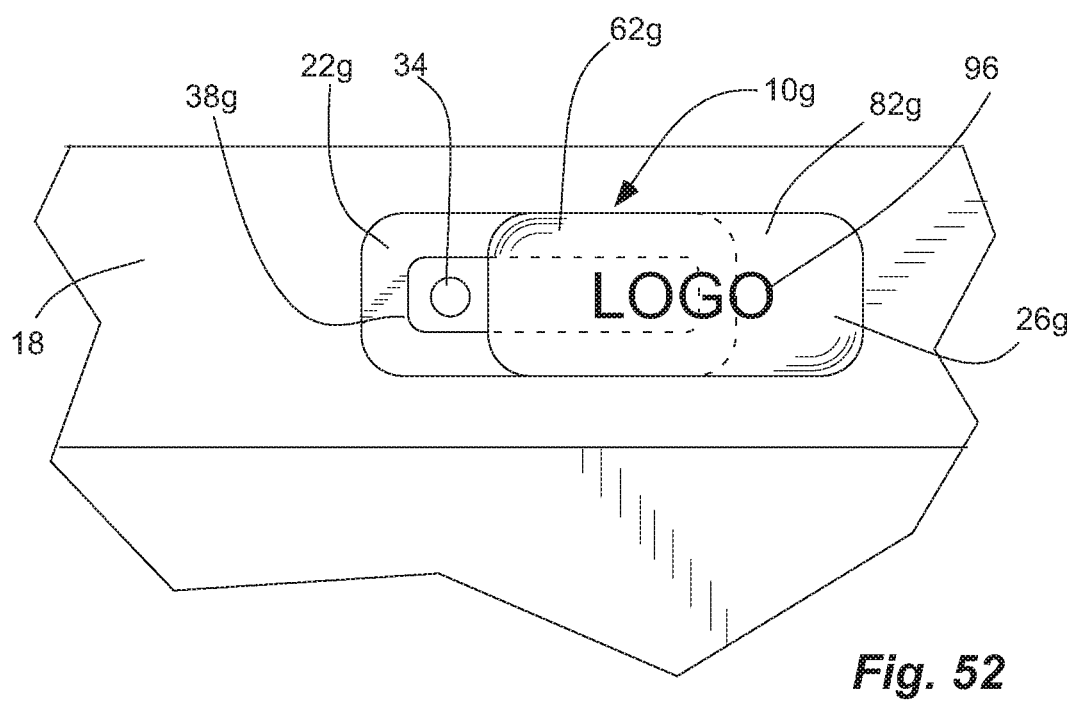
FIG. 52 is a schematic view of the privacy shutter of FIG. 47, shown in the open or use position on the computer.

The fingertip grip 62g can have a dome 82g that both substantially span the outer surface of the screen 26g, as shown in FIG. 47. Thus, the fingertip grip 62g can match the profile of the screen 26g to allow sufficient surface are to be engaged by a fingertip.

In another aspect, the dome as described above can be carried by, and/or coupled to, the frame; and can thus be immobile while the screen moves between the open and closed positions. The dome with the indicium thereof can help identify the location of the privacy shutter, and/or can call attention to the position status (open or closed) of the shutter or screen. In addition, the dome can provide a bumper for computer devices that close, such as laptop computers.

A method for selectively covering and exposing a camera lens of a computer device, and for using the lens covers or privacy shutters described above, comprises: securing a frame on the computer device with an aperture of the frame aligned the camera lens, and with the frame circumscribing the camera lens; and selectively moving the screen between two positions, including: an open position and a closed position. In one aspect, the fingertip grip and the dome can be engaged by a fingertip to move the screen.

The frames and screen described above can be formed of plastic and can be formed by injection molding.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A privacy shutter configured to selectively cover and expose a camera lens of a computer device, the privacy shutter comprising:
   a) a frame with an inner side configured to be affixed to a surface adjacent the camera lens on the computer device;
   b) a screen movably coupled to the frame and movable with respect to frame between:
      i) a closed position in which the screen is disposed in a first position with respect to the frame and is configured to be disposed over the camera lens of the computer device; and
      ii) an open position in which the screen is disposed in a different second position with respect to the frame and is configured to expose the camera lens of the computer device; and
   c) a fingertip grip coupled to the screen and comprising a low-profile dome having a broad width greater than a height thereof and a perimeter edge with a curved profile.

2. The privacy shutter in accordance with claim 1, wherein the fingertip grip has an exposed surface that is tacky.

3. The privacy shutter in accordance with claim 1, further comprising:
   indicium carried by the fingertip grip.

4. The privacy shutter in accordance with claim 3, further comprising:
   the dome being at least translucent; and
   the indicium being disposed underneath the dome and visible therethrough.

5. The privacy shutter in accordance with claim 1, further comprising:
   a cavity in the screen facing outwardly with respect to the privacy shutter; and
   the dome being disposed in the cavity.

6. The privacy shutter in accordance with claim 5, further comprising:
   a lip extending from the screen and substantially circumscribing the cavity and the dome.

7. The privacy shutter in accordance with claim 6, wherein an outermost portion of the dome is substantially flush with, or recessed below, an outermost surface of the screen, or an outermost surface of the frame, or both.

8. The privacy shutter in accordance with claim 6, wherein an outermost portion of the dome extends beyond an outermost surface of the screen, or an outermost surface of the frame, or both.

9. The privacy shutter in accordance with claim 1, further comprising:
   a) an aperture circumscribed by the frame and configured to expose the camera lens on the computer device; and
   b) the screen being movable with respect to the aperture of the frame between:
      i) the closed position in which the screen is disposed across the aperture of the frame; and
      ii) the open position in which the screen exposes the aperture of the frame.

10. The privacy shutter in accordance with claim 9, wherein the screen is a slider slidable with respect to the frame, and further comprising:
    a) a channel in an outer side of the frame and extending from the aperture to a perimeter of the frame, the channel having opposite open ends with one open end in the aperture and another open end in the perimeter, the opposite open ends slidably receiving the slider therethrough;
    b) the channel having an outer opening and an inner cavity slidably receiving the slider therein, the outer opening of the channel exposing the outer surface of the slider in both the closed and opened positions, the outer opening being narrower than the inner cavity and forming opposite lips extending over the slider to retain the slider in the inner cavity of the channel; and
    c) the outer opening of the channel of the frame having a width between the lips less than a width of the aperture of the frame.

11. The privacy shutter in accordance with claim 10, further comprising:
    a) a pair of slots in the inner side of the frame on opposite sides of the aperture; and
    b) a pair of tabs extending from opposite sides of the slider and extending into the pair of slots, respectively, the pair of tabs slidable in the pair of slots as the slider slides.

12. The privacy shutter in accordance with claim 1, further comprising:
    a) a pinion gear with teeth pivotally coupled to the frame;
    b) a rack with teeth extending from the screen and engaging the pinion gear;

c) the fingertip grip carried by the pinion gear and pivoting the pinion gear to slide the screen between the open and closed positions.

13. The privacy shutter in accordance with claim 1, further comprising:
   a) the screen being pivotally coupled to the frame about a pivot between the frame and the screen;
   b) a stop between the screen and the frame to stop the screen from pivoting when in the closed position.

14. The privacy shutter in accordance with claim 1, further in combination with the computer device, wherein the frame is affixed to the surface adjacent the camera lens of the computer device, and wherein the screen is movable between the closed position with the screen disposed over the camera lens and the open position with the camera lens exposed with respect to the screen.

15. A privacy shutter configured to selectively cover and expose a camera lens of a computer device, the privacy shutter comprising:
   a) a frame with an inner side configured to be affixed to a surface adjacent the camera lens on the computer device;
   b) a screen movably coupled to the frame and movable with respect to frame between:
      i) a closed position in which the screen is disposed in a first position with respect to the frame and is configured to be disposed over the camera lens of the computer device; and
      ii) an open position in which the screen is disposed in a different second position with respect to the frame and is configured to expose the camera lens of the computer device;
   c) a low-profile dome carried by the frame or the screen, and having a broad width greater than a height thereof and a perimeter edge with a curved profile;
   d) the dome being at least translucent; and
   e) indicium being disposed underneath the dome and visible therethrough.

16. The privacy shutter in accordance with claim 15, wherein the dome comprises:
   a fingertip grip coupled to the screen and comprising an exposed surface that is tacky.

17. The privacy shutter in accordance with claim 15, further comprising:
   a cavity in the screen facing outwardly with respect to the privacy shutter;
   the dome being disposed in the cavity;
   an outermost portion of the dome is substantially flush with, or recessed below, an outermost surface of the screen, or an outermost surface of the frame, or both.

18. The privacy shutter in accordance with claim 15, further comprising:
   a) a channel in an outer side of the frame and extending from the aperture to a perimeter of the frame, the channel having opposite open ends with one open end in the aperture and another open end in the perimeter, the opposite open ends slidably receiving the slider therethrough;
   b) the channel having an outer opening and an inner cavity slidably receiving the slider therein, the outer opening of the channel exposing the outer surface of the slider in both the closed and opened positions, the outer opening being narrower than the inner cavity and forming opposite lips extending over the slider to retain the slider in the inner cavity of the channel;
   c) the outer opening of the channel of the frame having a width between the lips less than a width of the aperture of the frame;
   d) a pair of slots in the inner side of the frame on opposite sides of the aperture; and
   e) a pair of tabs extending from opposite sides of the slider and extending into the pair of slots, respectively, the pair of tabs slidable in the pair of slots as the slider slides.

19. The privacy shutter in accordance with claim 15, further comprising:
   a) a pinion gear with teeth pivotally coupled to the frame;
   b) a rack with teeth extending from the screen and engaging the pinion gear;
   c) the dome carried by the pinion gear and pivoting the pinion gear to slide the screen between the open and closed positions.

20. A privacy shutter configured to selectively cover and expose a camera lens of a computer device, the privacy shutter comprising:
   a) a frame with an inner side configured to be affixed to a surface adjacent the camera lens on the computer device, and having an aperture circumscribed by the frame and configured to expose the camera lens on the computer device;
   b) a screen movably coupled to the frame and movable with respect to frame and the aperture between:
      i) a closed position in which the screen is disposed across the aperture of the frame and is configured to be disposed over the camera lens of the computer device; and
      ii) an open position in which the screen exposes the aperture of the frame and is configured to expose the camera lens of the computer device;
   c) a cavity in the screen facing outwardly with respect to the privacy shutter;
   d) a fingertip grip coupled to the screen and disposed in the cavity of the screen;
   e) the fingertip grip comprising a low-profile dome having a broad width greater than a height thereof and a perimeter edge with a curved profile;
   f) an outermost portion of the dome is substantially flush with, or recessed below, an outermost surface of the screen, or an outermost surface of the frame, or both;
   g) the dome being at least translucent; and
   h) indicium being disposed underneath the dome and visible therethrough.

* * * * *